US012657699B2

(12) United States Patent
Guo et al.

(10) Patent No.: US 12,657,699 B2
(45) Date of Patent: Jun. 16, 2026

(54) METHOD AND SYSTEM FOR DETERMINING BLOOD VESSEL INFORMATION IN AN IMAGE

(71) Applicant: SHANGHAI UNITED IMAGING HEALTHCARE CO., LTD., Shanghai (CN)

(72) Inventors: Yuxiang Guo, Shanghai (CN); Shaofeng Yuan, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 575 days.

(21) Appl. No.: 18/061,996

(22) Filed: Dec. 5, 2022

(65) Prior Publication Data

US 2023/0104173 A1 Apr. 6, 2023

Related U.S. Application Data

(63) Continuation of application No. PCT/CN2021/098691, filed on Jun. 7, 2021.

(30) Foreign Application Priority Data

Jun. 5, 2020 (CN) ......................... 202010505648.X

(51) Int. Cl.
*G06K 9/00* (2022.01)
*G06T 7/00* (2017.01)
(Continued)

(52) U.S. Cl.
CPC .............. *G06T 7/0012* (2013.01); *G06T 7/70* (2017.01); *G06V 10/25* (2022.01); *G06V 10/764* (2022.01);
(Continued)

(58) Field of Classification Search
CPC ........... G06T 2207/30104; G06T 2207/20084
See application file for complete search history.

(56) References Cited

U.S. PATENT DOCUMENTS 9,349,178 B1 * 5/2016 Itu ........................... G16H 50/20
9,984,465 B1 * 5/2018 Ma ......................... G06T 7/0016
(Continued)

FOREIGN PATENT DOCUMENTS

CN 104573712 A 4/2015
CN 104573716 A 4/2015
(Continued)

OTHER PUBLICATIONS

Li, Liangzhi et al., Joint Learning of Vessel Segmentation and Artery/Vein Classification with Post-processing, arXiv, Jan. 14, 2020.
(Continued)

*Primary Examiner* — Hadi Akhavannik
(74) *Attorney, Agent, or Firm* — METIS IP LLC

(57) ABSTRACT

A method for determining blood vessel information in an image may include acquiring image data including a target blood vessel. The method may also include determining a first portion of a plurality of branches of the target blood vessel from the image data based on the one or more trained neural network models and determining a second portion of the plurality of branches of the target blood vessel from the image data based on one or more constraint conditions. The second portion of the branches may be a branch structure of at least one of the first portion of the branches. The method may further include determining the target blood vessel based on the first portion of the branches and the second portion of the branches. The target blood vessel may include at least one of an arterial blood vessel or a venous blood vessel.

19 Claims, 12 Drawing Sheets

(51) Int. Cl.

| | | |
|---|---|---|
| *G06T 7/70* | (2017.01) |
| *G06V 10/25* | (2022.01) |
| *G06V 10/764* | (2022.01) |
| *G06V 10/82* | (2022.01) |

(52) U.S. Cl.
CPC .... *G06V 10/82* (2022.01); *G06T 2207/10072* (2013.01); *G06T 2207/20021* (2013.01); *G06T 2207/20084* (2013.01); *G06T 2207/30101* (2013.01); *G06V 2201/03* (2022.01)

(56) References Cited

U.S. PATENT DOCUMENTS

| | | | | |
|---|---|---|---|---|
| 2014/0316248 | A1* | 10/2014 | deCharms | A61B 5/4088 |
| | | | | 600/411 |
| 2016/0148372 | A1* | 5/2016 | Itu | G16H 50/20 |
| | | | | 382/128 |
| 2017/0042495 | A1* | 2/2017 | Matsuzaki | A61B 5/055 |
| 2019/0014982 | A1* | 1/2019 | Bhuiyan | G06T 7/44 |
| 2019/0130578 | A1 | 5/2019 | Gulsun et al. | |
| 2019/0205606 | A1* | 7/2019 | Zhou | G06F 18/285 |
| 2019/0209867 | A1 | 7/2019 | Sun et al. | |
| 2020/0085382 | A1* | 3/2020 | Taerum | A61B 5/7264 |

| | | | |
|---|---|---|---|
| 2020/0205766 | A1 | 7/2020 | Wu et al. |
| 2021/0022617 | A1 | 1/2021 | Zhao et al. |

FOREIGN PATENT DOCUMENTS

| | | | |
|---|---|---|---|
| CN | 107203741 | A | 9/2017 |
| CN | 108186038 | A | 6/2018 |
| CN | 109584223 | A | 4/2019 |
| CN | 109978796 | A | 7/2019 |
| CN | 110222759 | A | 9/2019 |
| CN | 110755104 | A | 2/2020 |
| CN | 111091573 | A | 5/2020 |
| CN | 111145137 | A | 5/2020 |
| CN | 111192320 | A | 5/2020 |
| CN | 111696089 | A | 9/2020 |
| CN | 107374657 | B | 5/2021 |

OTHER PUBLICATIONS

International Search Report in PCT/CN2021/098691 mailed on Sep. 7, 2021, 8 pages.

Written Opinion in PCT/CN2021/098691 mailed on Sep. 7, 2021, 12 pages.

First Office Action in Chinese Application No. 202010505648.X mailed on Apr. 28, 2022, 16 pages.

* cited by examiner

120A

| | |
|---|---|
| Acquisition module 302 | First portion determination module 304 |
| Second portion determination module 306 | Target blood vessel determination module 308 |

120B

Acquisition module
301

Model generation module
303

<u>400</u>

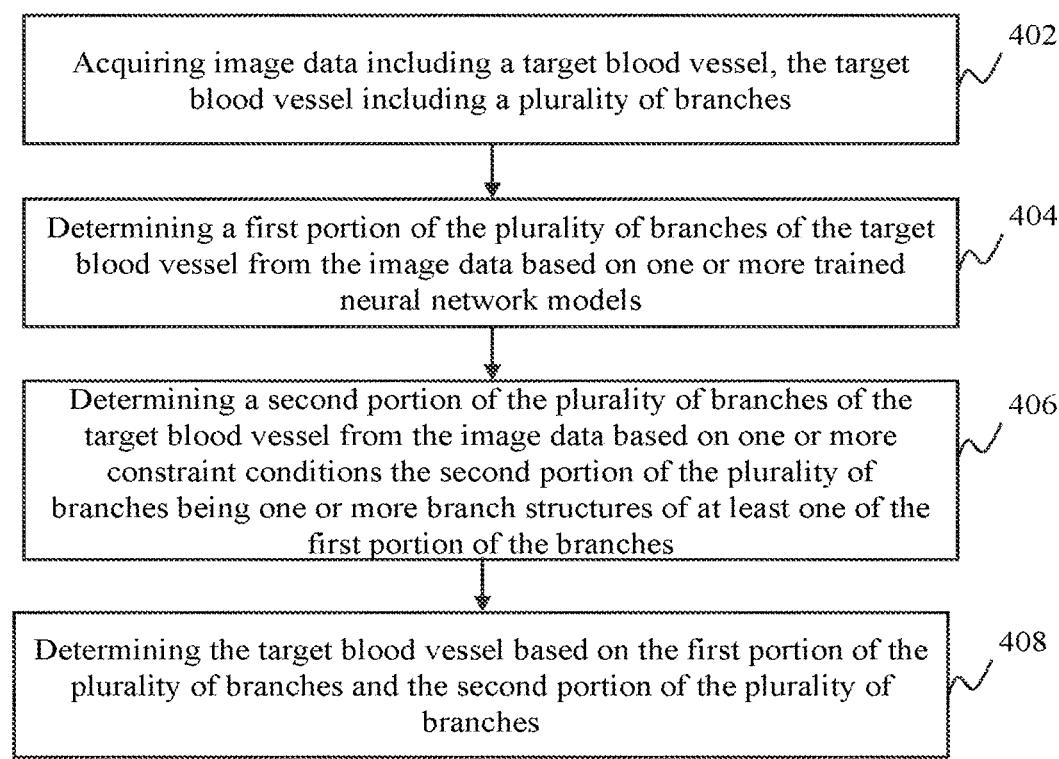

Acquiring image data including a target blood vessel, the target blood vessel including a plurality of branches     402

Determining a first portion of the plurality of branches of the target blood vessel from the image data based on one or more trained neural network models     404

Determining a second portion of the plurality of branches of the target blood vessel from the image data based on one or more constraint conditions the second portion of the plurality of branches being one or more branch structures of at least one of the first portion of the branches     406

Determining the target blood vessel based on the first portion of the plurality of branches and the second portion of the plurality of branches     408

Figure 8:
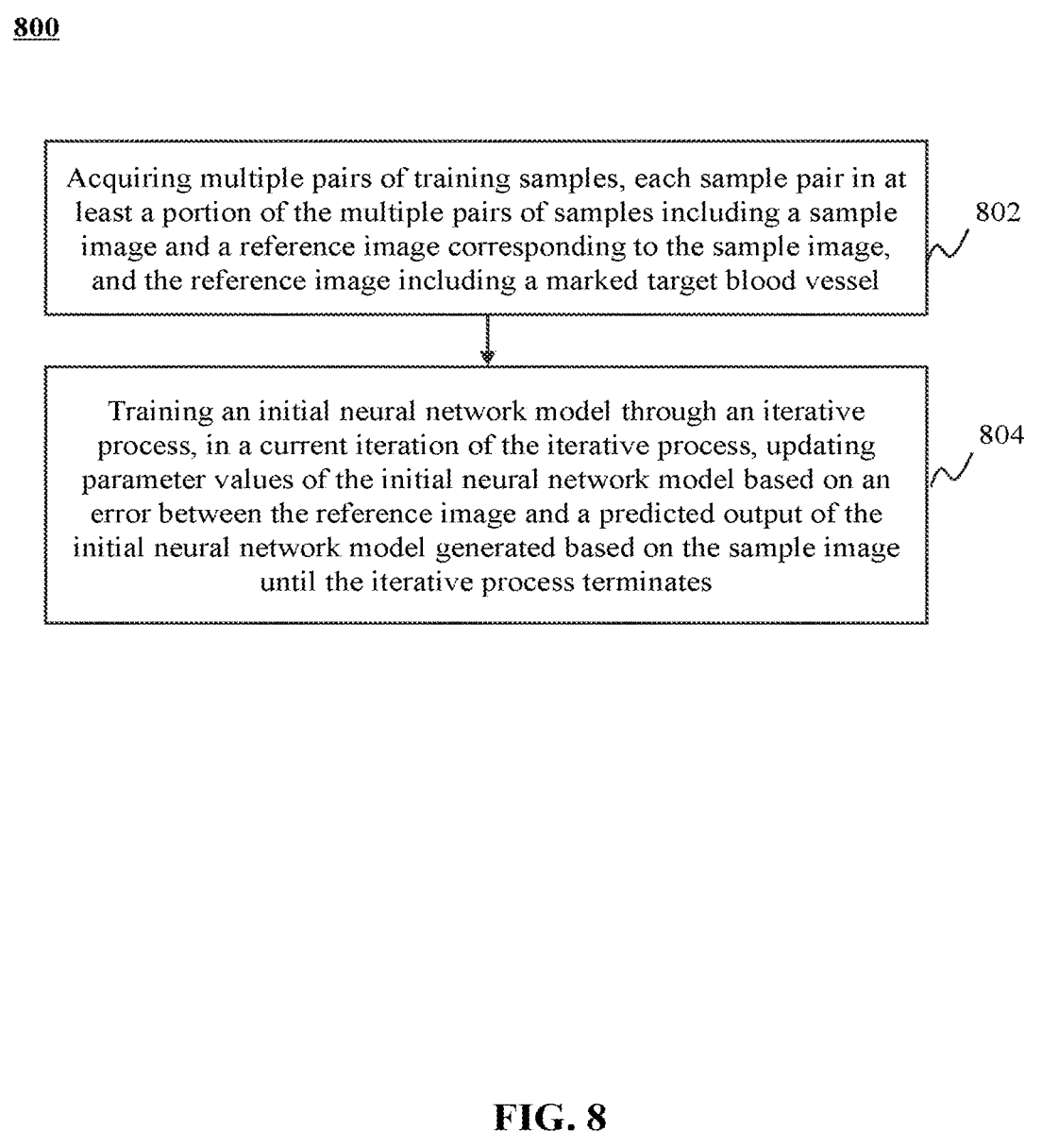

Acquiring multiple pairs of training samples, each sample pair in at least a portion of the multiple pairs of samples including a sample image and a reference image corresponding to the sample image, and the reference image including a marked target blood vessel

802

Training an initial neural network model through an iterative process, in a current iteration of the iterative process, updating parameter values of the initial neural network model based on an error between the reference image and a predicted output of the initial neural network model generated based on the sample image until the iterative process terminates

METHOD AND SYSTEM FOR DETERMINING BLOOD VESSEL INFORMATION IN AN IMAGE

CROSS-REFERENCE TO RELATED APPLICATIONS

This application is a continuation of International Application No. PCT/CN2021/098691, filed on Jun. 7, 2021, which claims priority to Chinese Application No. 202010505648.X filed on Jun. 5, 2020, the contents of which are incorporated herein by reference.

TECHNICAL FIELD

The present disclosure relates to image processing, and in particular, to a method and a system for determining an artery and vein.

BACKGROUND

Pulmonary disease has a high incidence rate. The prevention and treatment of pulmonary disease depend on accurate diagnosis and quantitative analysis. The difficulty of diagnosis and quantitative analysis lies in the reconstruction of the pulmonary vascular tree. Pulmonary vessels (e.g., the pulmonary artery and pulmonary vein) are characterized by noise, small structures, tracheal interference, complex structures, numerous bifurcations, diverse sizes, complex surrounding tissue structures, etc. In addition, due to the resolution and volume effect of the image, there are many adhesions between the pulmonary artery and the pulmonary vein in the main trunk and the distal thin branches, and there is no obvious independent separation in the image, resulting in a low reconstruction speed, poor accuracy, etc., of the pulmonary vascular tree. Therefore, there is a need to provide a method and a system of accurately and efficiently extracting the arterial blood vessel and the venous blood vessel.

SUMMARY

An aspect of the present disclosure provides a system for determining blood vessel information in an image. The system may include at least one storage device for storing a set of instructions and at least one processing device. The at least one processing device may communicate with the at least one storage device, and when executed by the processing device, the set of instructions may cause the system to perform the following operations. The operations may include acquiring image data including a target blood vessel that includes a plurality of branches. The operations may also include determining a first portion of the plurality of branches of the target blood vessel from the image data based on one or more trained neural network models and determining a second portion of the plurality of branches of the target blood vessel from the image data. The second portion of the plurality of branches may be one or more branch structures of at least one of the first portion of the plurality of branches. The operations may further include determining the target blood vessel based on the first portion of the plurality of branches and the second portion of the plurality of branches. The target blood vessel may include at least one of an arterial blood vessel or a venous blood vessel.

In some embodiments, determining a first portion of the plurality of branches of the target blood vessel from the image data based on one or more trained neural network models may include obtaining processed image data by processing the image data. The processed image data may have a higher spatial resolution than the image data. The determining a first portion of the plurality of branches of the target blood vessel from the image data based on one or more trained neural network models may also include determining the first portion of the plurality of branches from the processed image data based on at least one of the one or more trained neural network models.

In some embodiments, determining a first portion of the plurality of branches of the target blood vessel from the image data based on one or more trained neural network models may include determining a region of interest in the image data, the region of interest including the target blood vessel; and determining the first portion of the plurality of branches based on the region of interest and at least one of the one or more trained neural network models.

In some embodiments, the one or more trained neural network models may comprise a first segmentation model, and determining the region of interest in the image data may comprise obtaining a first image by performing a first operation on the image data, determining an overview of the target blood vessel in the first image by segmenting the first image based on the first segmentation model, and determining the region of interest based on the overview of the target blood vessel.

In some embodiments, the one or more trained neural network models may include a second segmentation model, and the determining the first portion of the plurality of branches based on the region of interest and at least one of the one or more trained neural network models may comprise obtaining a second image by extracting the region of interest from the image data, obtaining a third image by performing a second operation on the second image, and determining the first portion of the plurality of branches in the third image based on the second segmentation model.

In some embodiments, the at least one of the one or more trained neural network models may be acquired through a training process. The training process may include obtaining multiple pairs of samples. Each pair in at least a portion of the multiple pairs of samples may include a sample image and a reference image corresponding to the sample image, and the reference image may include a marked target blood vessel. The training process may also include training an initial neural network model through an iterative process. In a current iteration of the iterative process, parameter values of the initial neural network model may be updated based on an error between the reference image and a predicted output of the initial neural network model generated based on the sample image until the iterative process terminates.

In some embodiments, at least one of local features or global features of the target blood vessel determined based on the second portion of the plurality of branches and the first portion of the plurality of branches may satisfy the one or more constraint conditions.

In some embodiments, the one or more constraint conditions may include a constraint condition related to the local features of the target blood vessel. The constraint condition related to the local features of the target blood vessel may include at least one of: an included angle between two adjacent branches of the target blood vessel being smaller than an included angle threshold or a diameter of a branch of the target blood vessel gradually decreasing from an upstream branch to a downstream branch.

In some embodiments, the one or more constraint conditions may include a constraint condition related to the global features of the target blood vessel. The constraint condition

3 related to the global features of the target blood vessel may include that includes that the target blood vessel is a tree-like structure, the arterial blood vessel or the venous blood vessel is continuous, the arterial blood vessel is not connected with the venous blood vessel, and any branch of the plurality of branches belongs to only one of the arterial blood vessel or the venous blood vessel.

In some embodiments, determining the first portion of the plurality of branches from the image data based on the one or more trained neural network models may comprise: separating a first portion of branches of the arterial vessel and a first portion of branches of the venous vessel from the image data based on the one or more trained neural network models. The determining the second portion of the plurality of branches from the image data based on one or more constraint conditions may include: separating a second portion of branches of the arterial blood vessel and a second portion of branches of the venous blood vessel from the image data based on the one or more constraint conditions.

In some embodiments, determining the target blood vessel based on the first portion of the branches and the second portion of the branches may comprise: determining the arterial blood vessel based on the first portion of branches of the arterial blood vessel and the second portion of branches of the arterial blood vessel; and determining the venous blood vessel based on the first portion of branches of the venous blood vessel and the second portion of branches of the venous blood vessel.

In some embodiments, separating the second portion of branches of the arterial blood vessel and the second portion of branches of the venous blood vessel from the image data based on the one or more constraint conditions may comprise: extracting the second portion of the plurality of branches from the image data; determining intersection points between the second portion of the plurality of branches based on the one or more constraint conditions; and determining the second portion of branches of the arterial blood vessel and the second portion of branches of the venous blood vessel by classifying the second portion of the plurality of branches based on the intersection points.

In some embodiments, determining intersection points between the second portion of the plurality of branches based on the one or more constraint conditions may comprise: constructing an energy term network based on the extracted second portion of the plurality of branches and the one or more constraint conditions. Adjacent nodes in the energy term network may correspond to two adjacent branches, a connection between the two adjacent nodes may be expressed through an energy term, and the energy term may include a difference between a local feature of the two adjacent branches and a constraint condition related to the local feature. The determining intersection points between the second portion of the plurality of branches based on the one or more constraint conditions may also include determining an optimal solution of the energy term network based on global features of the arterial blood vessel and the venous blood vessel. The optimal solution of the energy term network may be such that when the energy term network is disconnected along one or more target nodes, two disconnected portions of the energy term network may correspond to an actual venous blood vessel and an actual arterial blood vessel, respectively, and the one or more target nodes may be intersection points of the arterial blood vessel and the venous blood vessel.

In some embodiments, determining the second portion of the plurality of branches from the image data based on one or more constraint conditions may comprise determining end position information of the first portion of the plurality of branches in the image data; and determining the second portion of the plurality of branches based on the one or more constraint conditions and the end position information of the first portion of the plurality of branches by using a tracking algorithm. The one or more constraint conditions may be used in a process of tracking the second portion of the plurality of branches to constrain the second portion of the plurality of branches to allow the one or more constraint conditions to be satisfied.

Another aspect of the present disclosure provides a system for determining blood vessel information in an image. The system may include an acquisition module for acquiring image data including a target blood vessel. The target blood vessel may include a plurality of branches. The system may also include a first portion determination module for determining a first portion of the plurality of branches of the target blood vessel from the image data based on one or more trained neural network models. The system may further include a second portion determination module for determining a second portion of the plurality of branches of the target blood vessel from the image data based on one or more constraint conditions. The second portion of the plurality of branches may be one or more branch structures of at least one of the first portion of the plurality of branches. The system further may include a target blood vessel determination module configured to determine the target blood vessel based on the first portion of the plurality of branches and the second portion of the plurality of branches. The target blood vessel may include at least one of an arterial blood vessel or a venous blood vessel.

Another aspect of the present disclosure provides a non-transitory computer-readable storage medium. The non-transitory computer-readable storage medium may include at least one set of instructions instruct the at least one processor to perform a method of determining blood vessel information in an image. The method may include acquiring image data including a target blood vessel, the target blood vessel including a plurality of branches. The method may further include determining a first portion of the plurality of branches of the target blood vessel from the image data based on one or more trained neural network models. The method may further include determining from the image data a second portion of the plurality of branches of the target blood vessel based on one or more constraint conditions, the second portion of the branches being a branch structure of at least one of the first portion of the branches. The method further includes determining the target blood vessel based on the first portion of the plurality of branches and the second portion of the plurality of branches, the target blood vessel including at least one of an arterial blood vessel or a venous blood vessel.

One aspect of the present disclosure provides a method for determining blood vessel information in an image. The method for determining blood vessel information in an image may include acquiring image data including a target blood vessel, the target blood vessel including a plurality of branches. The method may further include determining a first portion of the plurality of branches of the target blood vessel from the image data based on one or more trained neural network models. The method may further include determining from the image data a second portion of the plurality of branches of the target blood vessel based on one or more constraint conditions, the second portion of the branches being a branch structure of at least one of the first portion of the branches. The method further includes determining the target blood vessel based on the first portion of the plurality of branches and the second portion of the plurality of branches, the target blood vessel including at least one of an arterial blood vessel or a venous blood vessel.

BRIEF DESCRIPTION OF THE DRAWINGS

The present disclosure will be further described in the form of exemplary embodiments, which will be described in detail by the accompanying drawings. These embodiments are not restrictive. In these embodiments, the same number represents the same structure, wherein:

FIG. 4 is a flowchart of an exemplary process 400 for determining blood vessel information in an image according to some embodiments of the present disclosure.

FIG. 8 is a flowchart of an exemplary process for generating a trained neural network model according to some embodiments of the present disclosure.

DETAILED DESCRIPTION

In order to more clearly explain the technical scheme of the embodiments of the present disclosure, the following will briefly introduce the drawings that need to be used in the description of the embodiments. Obviously, the drawings in the following description are only some examples or embodiments of the present disclosure. For those skilled in the art, the present disclosure can also be applied to other similar scenarios according to these drawings without creative work. Unless it is obvious from the language environment or otherwise stated, the same label in the figure represents the same structure or operation.

It should be understood that the "system", "device", "unit" and/or "module" used herein is a method for distinguishing different components, elements, portions or assemblies at different levels. However, if other words can achieve the same purpose, they can be replaced by other expressions.

As shown in the description and the claims, unless the context expressly indicates exceptions, the words "a", "an", "the", "one", and/or "this" do not specifically refer to the singular, but may also include the plural; and the plural forms may be intended to include the singular forms as well, unless the context clearly indicates otherwise. Generally speaking, the terms "include" only indicate that the steps and elements that have been clearly identified are included, and these steps and elements do not constitute an exclusive list. Methods or equipment may also include other steps or elements.

A flowchart is used in this disclosure to explain the operation performed by the system according to the embodiment of the present disclosure. It should be understood that the previous or subsequent operations are not necessarily performed accurately in order. Instead, the steps may be processed in reverse order or simultaneously. At the same time, you can add other operations to these processes, or remove one or more steps from these processes.

Figure 1:
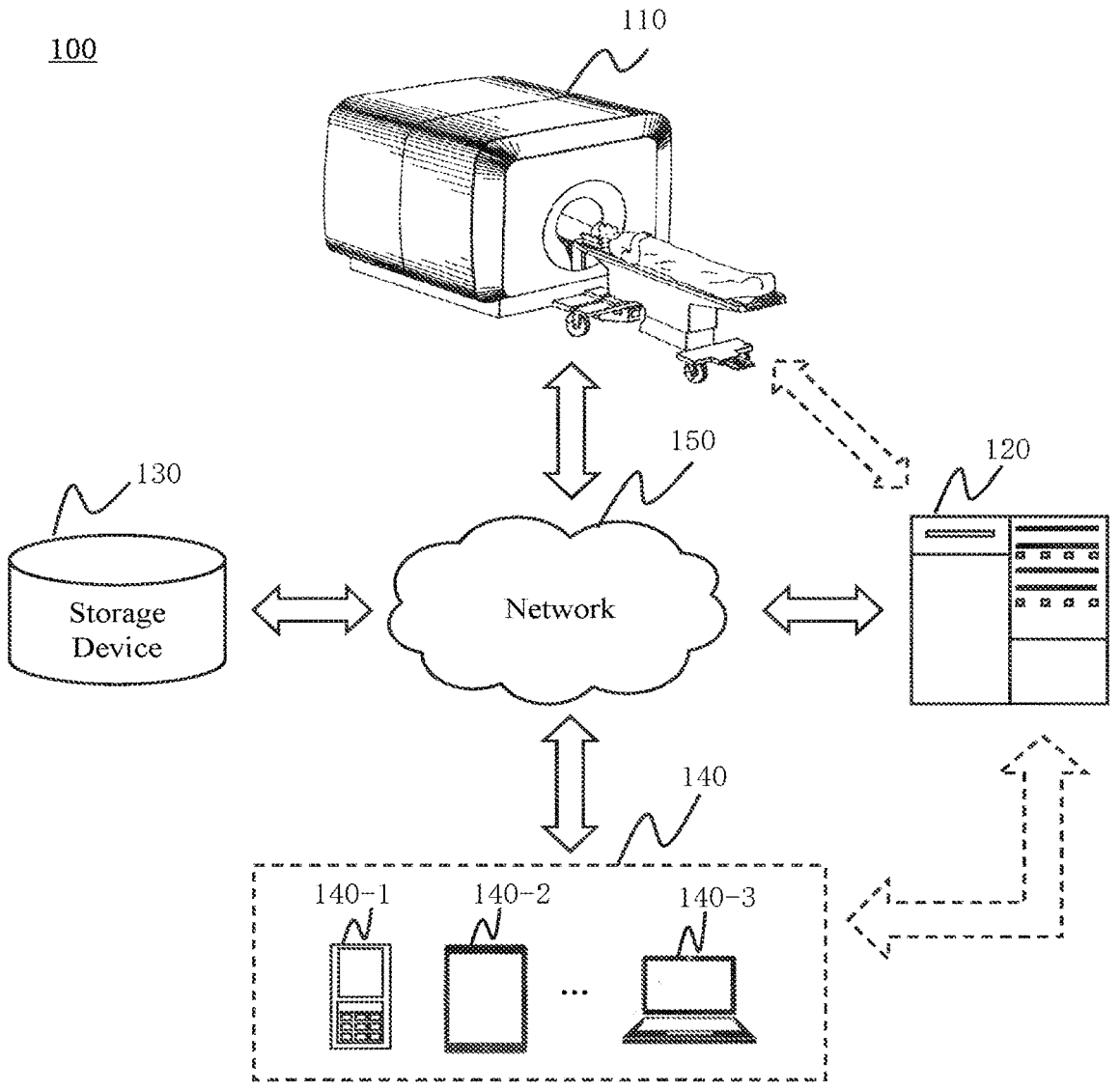
FIG. 1 is a schematic diagram of an exemplary image processing system according to some embodiments of the present disclosure.

FIG. 1 is a schematic diagram of an exemplary image processing system according to some embodiments of the present disclosure. As shown in FIG. 1, the image processing system 100 may include an imaging device 110, a processing device 120, a storage device 130, a terminal(s) 140, and a network 150. Components in the image processing system 100 may be connected to each other in a variety of ways. For example, the imaging device 110 may be connected to the processing device 120 via the network 150. As another example, the imaging device 110 may be directly connected to the processing device 120. As another example, the storage device 130 may be connected to the processing device 120 directly or via the network 150. As another example, the terminal(s) 140 may be connected to the processing device 120 directly or via the network 150.

The imaging device 110 may generate or provide image data related to a target object by scanning the target object. In some embodiments, the target object may include a biological target object and/or a non-biological target object. The biological target object may be a human, an animal, a plant, or a portion thereof (e.g., cell, tissue, organ, etc.). For example, the target object may include a specific portion of the body, such as the head, chest, abdomen, etc., or a combination thereof. The imaging device 110 may include a single-modality scanner such as a computed tomography (CT) device, a digital radiography (DR) device, a positron emission tomography (PET) device, a nuclear magnetic resonance scanning (NMR) device, or a multi-modality scanner state scanner (e.g., ET-CT scanner). In some embodiments, the image data related to the object may be projection data of the object, one or more images, or the like. The projection data may include raw data generated by the imaging device 110 by scanning the target object and/or data generated by forward projecting an image of the target object.

In some embodiments, the processing device 120 may process data and/or information acquired from the imaging device 110, the terminal(s) 140, or the storage device 130. For example, the processing device 120 may acquire image data including a target blood vessel. The target blood vessel may include a first portion of the plurality of branches and a second portion of plurality of branches, and at least portion of the second portion of the plurality of branches may be a branch structure of the first portion of the plurality of branches. The processing device 120 may determine the first portion of the plurality of branches from the image data based on one or more trained neural network models. The processing device 120 may determine the second portion of the plurality of branches from the image data based on one or more constraint conditions. The processing device 120 may determine the target blood vessel based on the first portion of the plurality of branches and the second portion of the plurality of branches. In some embodiments, the one or more trained neural network models may be generated by a processing device of a system other than the imaging system 100, or a server other than the processing device 120 on which the trained neural network model is applied. For example, a trained neural network model may be generated by a first system of a supplier that provides and/or maintains such models, while applying the trained neural network model may be executed on a second system of a customer a buyer. In some embodiments, one or more trained neural network models may be applied online in response to an image segmentation request. In some embodiments, one or more trained neural network models may be determined or generated offline.

The processing device 120 may be a central processing unit (CPU), digital signal processor (DSP), system on chip (SoC), microprocessor (MCU), etc., or any combination thereof. In some embodiments, the processing device 120 may be local or remote. For example, the processing device 120 may access information and/or data stored in the imaging device 110, the terminal(s) 140, and/or the storage device 130 via the network 150. As another example, the processing device 120 may be directly connected to the imaging device 110, the terminal(s) 140 and/or the storage device 130 in order to access information and/or data stored therein. In some embodiments, the processing device 120 may be implemented on a cloud platform. For example only, the cloud platform may include a private cloud, public cloud, hybrid cloud, community cloud, distributed cloud, cross-cloud, multi-cloud, etc., or any combination thereof. In some embodiments, the processing device 120 may be implemented on the computing device 200 having at least one component shown in FIG. 2 of the present disclosure.

The storage device 130 may store data and/or instructions. In some embodiments, the storage device 130 may store data acquired from the terminal(s) 140 and/or the processing device 120. In some embodiments, the storage device 130 may store data and/or instructions that may be executed by the processing device 120 or configured to perform exemplary methods described in this disclosure. In some embodiments, the storage device 130 may include a mass storage, a removable storage, a volatile read-write memory, a read-only memory (ROM), the like, or any combination thereof. In some embodiments, the storage device 130 may be implemented on a cloud platform. For example only, the cloud platform may include a private cloud, a public cloud, a hybrid cloud, a community cloud, a distributed cloud, a cross-cloud, a multi-cloud, etc., or any combination thereof.

In some embodiments, the storage device 130 may be connected to the network 150 for communication with at least one component of the image processing system 100 (e.g., the terminal(s) 140, the processing device 120). The at least one component of the image processing system 100 may access data or instructions stored in the storage device 130 via the network 150. In some embodiments, the storage device 130 may directly connect or communicate with the at least one component of the image processing system 100 (e.g., the terminal(s) 140, the processing device 120). In some embodiments, the storage device 130 may be portion of the processing device 120.

The terminal(s) 140 may include a mobile device 140-1, a tablet computer 140-2, a laptop computer 140-3, or the like, or any combination thereof. In some embodiments, the mobile device 140-1 may include a smart home device, a wearable device, a smart mobile device, a virtual reality device, an augmented reality device, or the like, or any combination thereof. In some embodiments, the terminal(s) 140 may operate the imaging device 110 remotely. For example, the terminal(s) 140 may operate the imaging device 110 via a wireless connection. In some embodiments, the terminal(s) 140 may receive information and/or instructions input by a user and transmit the received information and/or instructions to the imaging device 110 or the processing device 120 via the network 150. In some embodiments, the terminal(s) 140 may receive data and/or information from the processing device 120. In some embodiments, the terminal(s) 140 may be portion of the processing device 120. In some embodiments, the terminal(s) 140 may be omitted.

The network 150 may facilitate the exchange of information and/or data. In some embodiments, at least one component (e.g., the imaging device 110, the terminal(s) 140, the processing device 120, or the storage device 130) in the image processing system 100 may transmit to another component in the image processing system 100 via the network 150 information and/or data. For example, the processing device 120 may obtain scan data from the imaging device 110 via the network 150. For another example, the processing device 120 may obtain the user instruction from the terminal(s) 140 through the network 150. In some embodiments, the network 150 may be any type of wired or wireless network, or a combination thereof. In some embodiments, the network 150 may include at least one network access point. For example, the network 150 may include wired or wireless network access points, such as base stations and/or Internet exchange points, through which one or more components of the image processing system 100 may be connected to the network 150 for exchanging data and/or or information.

The above description of the imaging system 100 is intended to be illustrative, and not intended to limit the scope of the present disclosure. Numerous alternatives, modifications and variations may be apparent to those of ordinary skill in the art. The features, structures, methods, and other features of the exemplary embodiments described herein may be combined in various ways to obtain additional and/or alternative exemplary embodiments. For example, the imaging system 100 may include one or more additional components. Additionally or alternatively, one or more components of the imaging system 100 described above may be omitted. As another example, two or more components of the imaging system 100 may be integrated into a single component.

Figure 2:
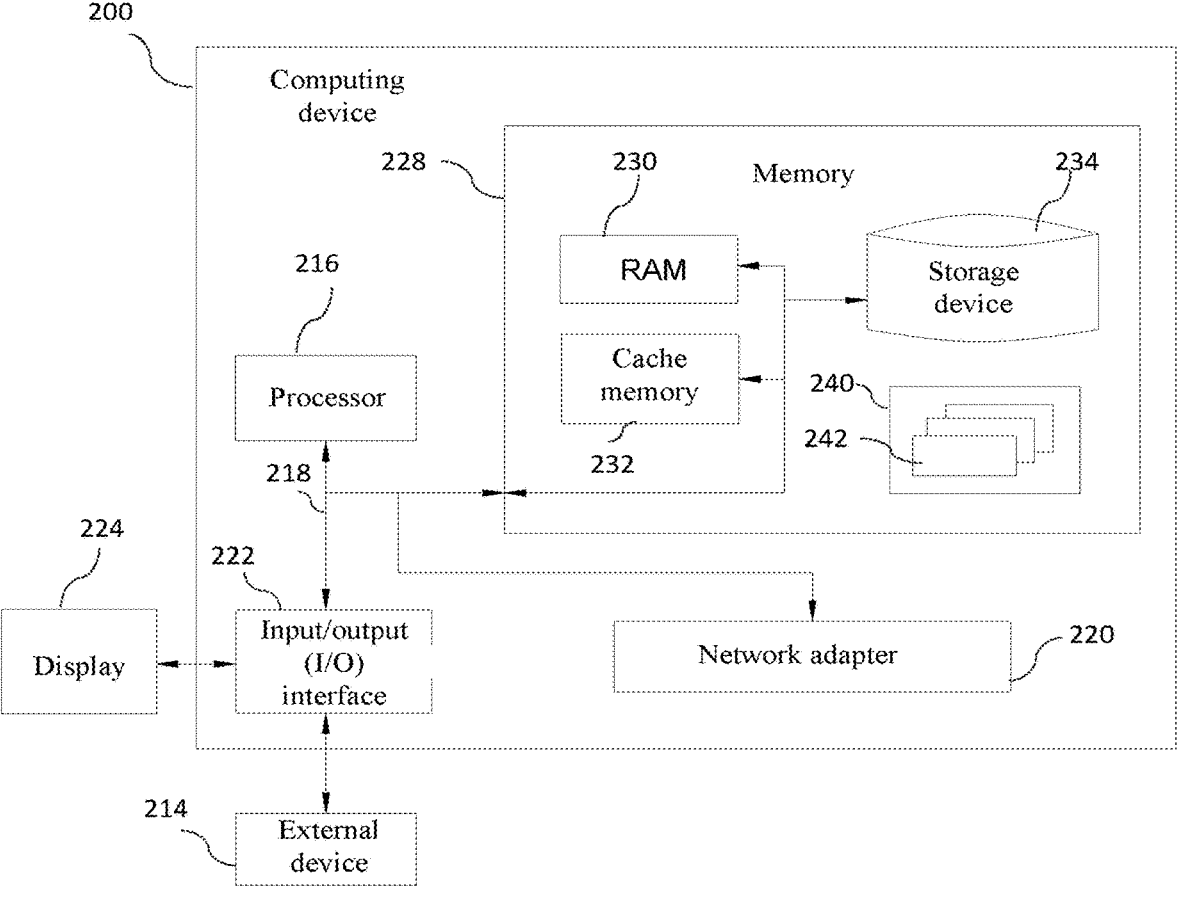
FIG. 2 is a schematic diagram of exemplary hardware and/or software components of a computing device according to some embodiments of the present disclosure.

FIG. 2 is a schematic diagram of exemplary hardware and/or software components of a computing device according to some embodiments of the present disclosure. The computing device 200 shown in FIG. 2 is only an example, and should not impose any limitations on the functions and scope of use of the embodiments of the present disclosure.

As shown in FIG. 2, components of the computing device 200 may include one or more processors 216, a memory 228, and a bus 218 connecting various system components including the memory 228 and the processor 216.

The bus 218 may represent one or more of several types of bus structures, including a memory bus or a memory controller, a peripheral bus, a graphics acceleration port, a processor, or a local bus using any of a variety of bus structures. By way of example, these architectures may include, but be not limited to, an Industry Standard Architecture (ISA) bus, a Micro Channel Architecture (MAC) bus, an Enhanced ISA bus, a Video Electronics Standards Association (VESA) local bus, and a Peripheral Component Interconnect (PCI) bus.

The computing device 200 may include a variety of computer system readable media. These media may be any available media that can be accessed by the computing device 200, including volatile and nonvolatile media, removable and non-removable media.

The memory 228 may include computer system readable media in a form of volatile memory, such as a random access memory (RAM) 230 and/or a cache memory 232. The computing device 200 may further include other removable/non-removable, volatile/non-volatile computer system storage media. For example only, the storage device 234 may be configured to read and write to non-removable, non-volatile magnetic media (not shown in FIG. 2, commonly referred to as a "hard drive"). Although not shown in the FIG. 2, disk drives may be provided for reading and writing to removable non-volatile magnetic disks (e.g., "floppy disks"), as well as removable non-volatile optical disks (e.g., CD-ROM, DVD-ROM) or other optical media) to read and write optical drives. In these cases, each drive may be connected to the bus 218 through one or more data media interfaces. The memory 228 may include at least one program product having a set (e.g., at least one) of program modules configured to perform functions of various embodiments of the present disclosure.

The computing device 200 may have a program/utility tool 240 of a set (at least one) of program modules 242, which may be stored, for example, in the memory 228, such program modules 242 may include, but not limited to, an operating system, one or more application programs, other program modules and program data. Each or some combination of these examples may include an implementation of a network environment. The program modules 242 may generally perform functions and/or methods of the described embodiments of the present disclosure.

The computing device 200 may communicate with one or more external devices 214 (e.g., a keyboard, a pointing device, a display 224, etc., where the display 224 may be configured according to actual needs). The computing device 200 may communicate with one or more devices that enable a user to interact with the computing device 200, and/or any device (e.g., a network card, a modem) that enables the computing device 200 to communicate with one or more other computing devices. Such communication may occur through an input/output (I/O) interface 222. Also, the computing device 200 may communicate with one or more networks (e.g., a local area network (LAN), a wide area network (WAN), and/or a public network such as the Internet) through a network adapter 220. As shown, the network adapter 220 may communicate with other modules of the computing device 200 via the bus 218. It should be understood that, although not shown in FIG. 2, other hardware and/or software modules may be used in conjunction with the computing device 200, the hardware and/or software modules including but not limited to: microcode, device drivers, redundant processing units, external disk drive arrays, RAID systems, tapes drives and data backup storage devices, etc.

The processor 216 may execute various functional applications and data processing by running programs stored in the memory 228, for example, to implement the method for determining an artery and vein provided by the embodiment of the present disclosure.

Figure 3A:
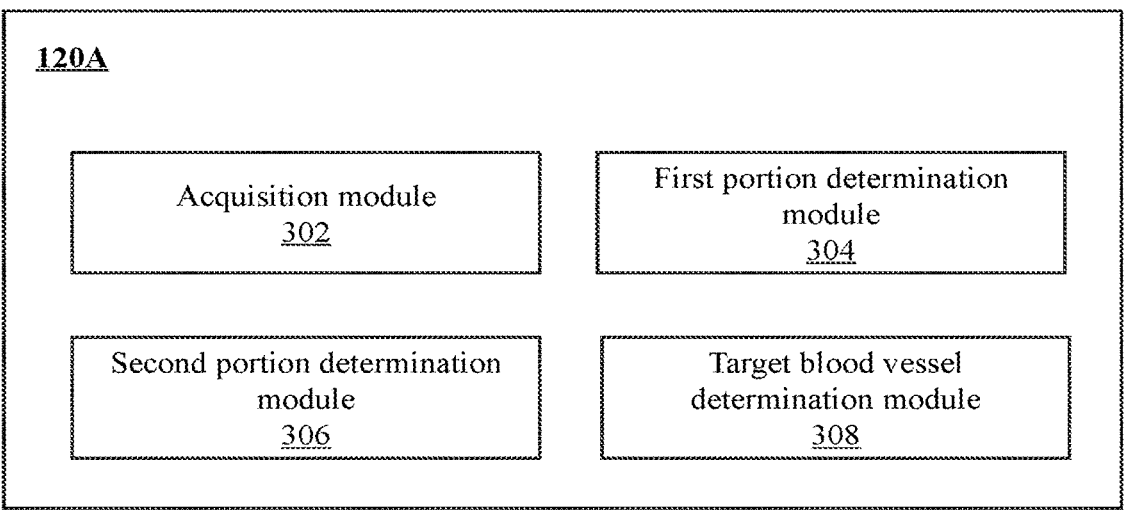
FIG. 3A and FIG. 3B are block diagrams of an exemplary processing device 120A and an exemplary processing device 120B according to some embodiments of the present disclosure.
Figure 3B:
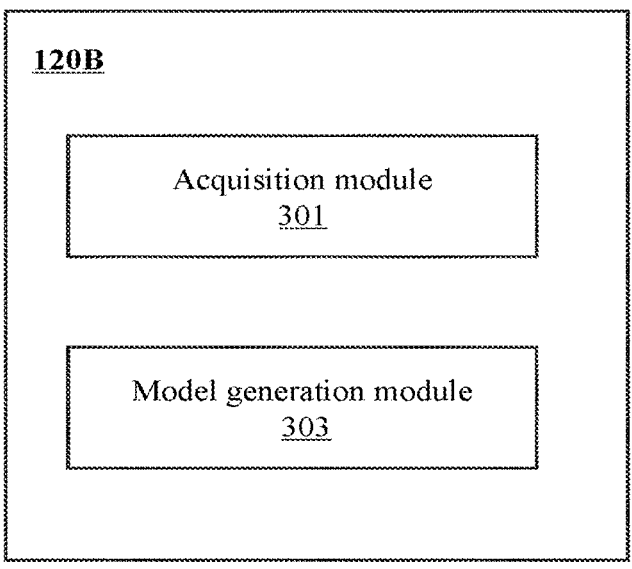

FIG. 3A and FIG. 3B are block diagrams of an exemplary processing device 120A and an exemplary processing device 120B according to some embodiments of the present disclosure. The processing devices 120A and 120B may be exemplary embodiments of the processing device 120 depicted in FIG. 1. In some embodiments, the processing device 120A may be configured for target blood vessel determination. The processing device 120B may be configured to obtain one or more training samples and/or use the training samples to generate a trained neural network model. In some embodiments, the processing devices 120A and 120B may each be implemented on a processing unit (e.g., the processor 216 shown in FIG. 2). By way of example only, the processing device 120A may be implemented on a CPU of the terminal device and the processing device 120B may be implemented on the computing device 200. Alternatively, the processing devices 120A and 120B may be implemented on the same computing device 200 or the CPU of the same terminal. For example, the processing devices 120A and 120B may be implemented on the same computing device 200. As shown in FIG. 3A, the processing device 120A may include an acquisition module 302, a first portion determination module 304, a second portion determination module 306, and a target blood vessel determination module 308.

The acquisition module 302 may be configured to acquire data in a process of determining the target blood vessel, for example, the image data, the trained neural network model, an image segmentation algorithm, and the like. More descriptions of acquiring image data of target blood vessels can be found elsewhere in this disclosure. Please refer to e.g., the operation 402 in FIG. 4 and its related description.

The first portion determination module 304 may be configured to determine the first portion of the branches in the target blood vessel based on the trained neural network model. More descriptions of determining the first portion of the plurality of branches of the target blood vessel can be found elsewhere in this disclosure. See, e.g., the operation 404 in FIG. 4 and process 500 in FIG. 5, and descriptions thereof. For example, the first portion determination module 304 may determine arterial trunk information and venous trunk information in the image data based on the trained neural network model. The arterial trunk and the venous trunk may be arterial blood vessel or the venous blood vessel of preset branches in the target blood vessel, respectively.

In some embodiments, the first portion determination module 304 may include a preprocessing unit for obtaining processed image data after processing the image data. For example, the preprocessing unit may be configured to resample the image data based on a reference physical size of the target pixel to obtain the processed image data. The first portion determination module 304 may further include an image acquisition unit for inputting the processed image data into the trained neural network model to obtain images of the first portion of the plurality of branches (e.g., arterial trunk and venous trunk images) of the target blood vessel.

In some embodiments, the first portion determination module 304 may include a first image determination unit, a region of interest of the target blood vessel determination unit, a overview image of the target blood vessel acquisition unit, a second image determination unit, a third image determination unit, and an image acquisition unit.

The first image determination unit may be configured to resample the image data based on the first physical size corresponding to the first target voxel to obtain a first image having the first target voxel. The overview image of the target blood vessel acquisition unit may be configured to input the first image into a first segmentation neural network model (also referred to as a first segmentation model) to obtain a overview image of the target blood vessel. The region of interest of the target blood vessel determination unit may be configured to determine the region of interest of the target blood vessel of the target blood vessel based on the overview image of the target blood vessel. A second image determination unit may be configured to determine, according to the region of interest of the target blood vessel, a second image corresponding to the region of interest of the target blood vessel in the medical image data. The third image determination unit may be configured to resample the second image based on second physical sizes corresponding to second target voxels to obtain a third image having the second target voxels. The image acquisition unit may be configured to input the third image into a second segmentation neural network model (also referred to as a second segmentation model) to obtain images of a second portion of the plurality of branches of the target blood vessel (for example, arterial trunk images and venous trunk images).

In some embodiments, the region of interest of the target blood vessel determination unit may include a maximum connected region determination subunit for determining a maximum connected region in the overview image of the target blood vessel; and a region of interest of the target blood vessel determination subunit for determining the maximum connected region as the region of interest of the target blood vessel.

The second portion determination module 306 may be configured to determine the second portion of the plurality of branches of the target blood vessel based on the one or more constraint conditions. More descriptions of determining the second portion of the plurality of branches of the target blood vessel can be found elsewhere in this disclosure. Please refer to, e.g., an operation 406 in FIG. 4 and its related description and process 600 in FIG. 6. For example, the second portion determination module 306 may determine the arterial thin branch information and the venous thin branch information in the image data based on the one or more constraint conditions.

In some embodiments, the second portion determination module 306 may include an end point determination unit for determining end point information of the first portion of the plurality of branches of the target blood vessel (e.g., the position and direction of the end point of the main artery or the main vein of the vein)). The second portion determination module 306 may further include an image acquisition unit for tracking arterial and venous thin branches using a blood vessel tracking algorithm based on tracking one or more constraint conditions, end point information and image data.

In some embodiments, the second portion determination module 306 may extract a unit for extracting the second portion of the plurality of branches of the target blood vessel. For example, the extraction unit may extract thin blood vessels of the target blood vessel from the image data based on a blood vessel segmentation technology, and the thin blood vessels may include arterial thin branches and venous thin branches. The second portion determination module 306 may further include an adhesion point determination unit for determining intersection points between the second portion of the branches in the target blood vessel (e.g., adhesion points between arterial thin branches and venous thin branches). The second portion determination module

306 may further include a determination unit for determining and distinguishing the second portion of branches of the arterial blood vessel and the second portion of branches of the venous blood vessel based on the intersection points (for example, the arterial thin branches and the venous thin branches in the thin blood vessel).

The target blood vessel determination module 308 may determine the target blood vessel based on the first portion of the branches and the second portion of the branches. For example, the target blood vessel determination module 308 may combine the arterial trunk information and the venous trunk information, the arterial thin branch information, and the venous thin branch information to obtain the arterial blood vessel information and the venous blood vessel information of the target blood vessel, and the arterial thin branches and the venous thin branches may be respectively in the target blood vessel, arterial blood vessel and venous blood vessel other than the preset branches. More descriptions of determining the target blood vessels can be found elsewhere in this disclosure. Please refer to, e.g., an operation 408 in FIG. 4 and its associated description.

An arteriovenous determination device provided in this embodiment may acquire image data including the target blood vessel by using an image data acquisition module; use the first portion determination module 304 and the second portion determination module 306 to extract a neural network model based on a pre-trained trunk to determine the arterial trunk information and the venous trunk information in the image data; use an arterial blood vessel determination module and a venous blood vessel determination module to determine the arterial thin branch information and the venous thin branch information in the image data based on one or more constraint conditions, and combine the arterial trunk information and the venous trunk information to obtain the arterial blood vessel information and venous blood vessel information of the target blood vessel. Above combination of neural network and traditional blood vessel processing methods, using trained neural network to directly segment main blood vessels of pulmonary artery and pulmonary vein, may well complete a separation task of the adhesion of main branches of pulmonary artery and pulmonary vein, using the traditional blood vessel processing methods to deal with thin blood vessels that cannot be identified by a deep neural network model, may quickly, accurately and completely achieve the separation of arterial blood vessel or the venous blood vessel.

As shown in FIG. 3B, the processing device 120B may include an acquisition module 301 and a model generation module 303.

The acquisition module 301 may be configured to acquire one or more training samples. More descriptions on obtaining training samples can be found elsewhere in this disclosure. Please refer to, e.g., the operation 802 in FIG. 8 and its related description.

The model generation module 303 may be configured to generate a trained neural network model (e.g., the first segmentation model and/or the second segmentation model) by training the initial model using the training samples. More descriptions on generating motion prediction models can be found elsewhere in this disclosure. Please refer to, e.g., operation 804 in FIG. 8 and its related description.

It should be noted that the above is provided for illustrative purposes only and is not intended to limit the scope of the present disclosure. For those of ordinary skill in the art, various changes and modifications can be made based on the description of the present disclosure. However, such changes and modifications do not depart from the scope of the disclosure. It should be understood that the processing device or each module shown in FIG. 3A and FIG. 3B may be implemented in various ways. For example, in some embodiments, the processing device and modules thereof may be implemented in hardware, software, or a combination of software and hardware. In some embodiments, the processing device 120A and/or the processing device 120B may share two or more modules, and any one module may be divided into two or more units. For example, the processing devices 120A and the processing 120B may share the same acquisition module; that is, the acquisition module 302 and the acquisition module 301 may be the same module. In some embodiments, the processing device 120A and/or processing device 120B may include one or more additional modules, such as a memory module (not shown) for storing data. In some embodiments, the processing device 120A and the processing device 120B may be integrated into one processing device 120.

FIG. 4 is a flowchart of an exemplary process 400 for determining blood vessel information in an image according to some embodiments of the present disclosure. Process 400 may be executed by the processing device 120 (e. g., the computing device 120A) or the computing device 200. For example, process 400 may be implemented as an instruction set (e. g., an application program) stored in, for example, a storage device 130, a memory 228, a memory external to and accessible by the image processing system. The processing device 120 or the computing device 210 may execute an instruction set, and when executing the instruction set, the processing device 120 or the computing device 210 may be configured to execute process 400. Operations of process 400 presented below are illustrative. In some embodiments, the process may be accomplished with one or more additional operations not described and/or one or more operations not discussed. In addition, a sequence of operations of process 400 shown in FIG. 4 and descriptions below are not intended to be restrictive.

In 402, the processing device 120A may acquire image data including the target blood vessel. In some embodiments, operation 402 may be performed by the acquisition module 302. As used herein, image data including the target blood vessel may mean that the image data includes an image representation of the target blood vessel. Similarly, "acquiring" or "determining" the target blood vessel or other structure (such as a branch of the target blood vessel) refers to "acquiring" or "determining" image data corresponding the target blood vessel or other structure. The target blood vessel may refer to a blood vessel that is at any portion of a target object (e.g., lung, heart, etc.) on which the imaging scan is performed. In some embodiments, the target object may include a biological subject, e.g., a human, an animal, or the like. In some embodiments, the target object may include a specific portion, organ, tissue, or the like. By way of example only, the target object may include the head, the chest, limbs, and the like. As another example, the target object may include the heart, a lung, a blood vessel, a liver, and the like. In some embodiments, the target object may include a non-biological subject, such as a phantom, a man-made object, or the like. In some embodiments, the blood vessel may be at least one of pulmonary blood vessels, liver blood vessels, and splenic blood vessels. The pulmonary blood vessels may include a pulmonary arterial blood vessel and a pulmonary venous blood vessel. The hepatic blood vessels may include a hepatic arterial blood vessel and a hepatic venous blood vessel, and the like.

In some embodiments, the target blood vessel may include a plurality of branches (or segments or units), and the plurality of branches may be distributed in a tree-like structure. As described herein, the target blood vessel being a tree-like structure may refer to that a connection relationship between the plurality of branches of the target blood vessel may be represented as a tree-like structure. For example, the plurality of branches of the target blood vessel may be represented as the plurality of branches of the tree-like structure. A latter branch of two interconnected branches may be referred to as a branch of a former branch. A branch may have a plurality of branches. In some embodiments, a diameter of the latter branch may be smaller than a diameter of the former branch.

In some embodiments, the plurality of branches of the target blood vessel (e.g., a venous blood vessel or an arterial blood vessel) may include a first portion (which may also be referred to as a first portion of the branches) and a second portion (which may also be referred to as a second portion of the branches)), and the second portion of the branches may be a branch structure of at least one branch in the first portion of the branches. In some embodiments, the first portion of the plurality of branches of the target blood vessel may include one or more main branches of the target blood vessel, and the second portion of the branches may include branches of the main branch (also referred to as thin branches, e.g., capillaries). In some embodiments, a main branch may refer to a branch with a diameter greater than a certain threshold; a thin branch may be a branch with a diameter smaller than a certain threshold. In some embodiments, the first portion of the plurality of branches of the target blood vessel may include preset branches. The preset branches may include an initial branch of the target blood vessel and a first branch, and the first branch may be a portion between a first bifurcation portion and a second bifurcation portion of the target blood vessel. The first bifurcation portion of the target blood vessel may be a portion where the bifurcation occurs for a first time starting from the initial branch of the target blood vessel, and the second bifurcation portion of the target blood vessel may be a portion where the bifurcation occurs for a first time starting from the first bifurcation portion of the target blood vessel, and so on, a Nth bifurcation portion of the target blood vessel may be a position where the bifurcation occurs for a first time starting from a N−1 bifurcation portion of the target blood vessel. In some embodiments, the preset branch may include an initial branch, the first branch, and a second branch of the target blood vessel. In some embodiments, the preset branches may include an initial branch, the first branch, . . . , a Nth branch of the target blood vessel, or the like.

In some embodiments, the second portion of the plurality of branches of the target blood vessel may include other branches other than the preset branches. For example, the first portion of the plurality of branches of the target blood vessel may include the initial branch and the first branch of the target blood vessel, and the second portion of the plurality of branches of the target blood vessel may include the second branch, a third branch, . . . and the Nth branch of the target blood vessel. As another example, the first portion of the plurality of branches of the target blood vessel may include the initial branch, the first branch, the second branch, the third branch, . . . and the N−1th branch of the target blood vessel, and the second portion of the plurality of branches of the target blood vessel may include the Nth branch. In some embodiments, the first and second portions of the plurality of branches of the target blood vessel may have the same branches. For example, the first portion of the plurality of branches of the target blood vessel may include the initial branch, a first branch, a second portion of the branches, . . . and a N–3 branch of the target blood vessel, and the second portion of the plurality of branches of the target blood vessel may include a N–3 branch, a N–2 branch, a N–1 branch and a N branch.

In some embodiments, the target blood vessel may include at least one of the arterial blood vessel or the venous blood vessel. In some embodiments, the first portion of branches of the arterial blood vessel may include one or more main branches of the arterial blood vessel (also referred to as the arterial trunk), and the second portion of branches of the arterial blood vessel may include one or more thin branches of the arterial blood vessel (also referred to as the arterial thin branches); the first portion of branches of the venous blood vessel may include one or more main branches of the venous blood vessel referred to as the venous trunk), and the second portion of branches of the venous blood vessel may include one or more thin branches of the venous blood vessel (referred to as the venous thin branches). In some embodiments, the first portion of branches of the arterial blood vessel may include the one or more main branches of the arterial blood vessel and a portion of thin branches of the arterial blood vessel, and the second portion of branches of the arterial blood vessel may include thin branches of the arterial blood vessel; the first portion of branches of the venous blood vessel may include the main branches of the venous blood vessel and a portion of thin branches of the venous blood vessel, and the second portion of branches of the venous blood vessel may include thin branches of the venous blood vessel.

In some embodiments, the image data may include medical images. The medical image may be a medical image acquired by scanning the target blood vessel with a medical scanning device using a medical imaging technique. In some embodiments, the medical scanning device may include a computed tomography device, a nuclear magnetic resonance scanning device, a positron emission tomography, the like, or a combination thereof.

In some embodiments, the medical imaging technique may be a vascular imaging technique. In some embodiments, the vascular imaging technique may include Computed Tomography Angiography (CTA), Magnetic Resonance Angiography (MRA), Digital Subtraction Angiography (DSA), etc.

In some embodiments, the image data may include a two-dimensional image, a three-dimensional image, and the like. In some embodiments, the image data may include one or more layers of two-dimensional tomographic images. Multilayer two-dimensional tomographic images may also be referred to as image sequences. In some embodiments, the image data may include three-dimensional data composed of a plurality of layers of the two-dimensional tomographic images. In some embodiments, the image data may be three-dimensional data corresponding to a three-dimensional image acquired by reconstructing a multi-layer tomographic image. In some embodiments, the image data may correspond to a CTA image sequence with fewer slices. In some embodiments, the image data may correspond to a CT image sequence with more slices. For example, the image data may be three-dimensional data corresponding to a sequence of CT images including pulmonary blood vessels.

In some embodiments, the image data of the target blood vessel may be acquired in real time during the scanning of the target blood vessel by the imaging device. In some embodiments, the acquired image data of the target blood vessel may be stored in a storage device or storage space, and may be read from the storage device or storage space to obtain the image data of the target blood vessel.

In 404, the processing device 120A may determine the first portion of the plurality of branches of the target blood vessel from the image data based on one or more trained neural network models. In some embodiments, operation 404 may be performed by the first portion determination module 304.

In some embodiments, the one or more trained neural network models may include a convolutional neural network model (CNN), a regional convolutional neural network model (R-CNN), an accelerated regional convolutional neural network model (Fast R-CNN, Faster R-CNN, etc.), an extended convolutional neural network model (Mask R-CNN), a fully convolutional neural network model (FCNN), a deep convolutional neural network model, etc. In some embodiments, the deep convolutional neural network may include an encoder-decoder symmetric deep neural network (U-Net deep convolutional neural network, V-Net deep convolutional neural network, and HourglassNet deep convolutional neural network), an encoder-decoder type asymmetric deep neural network, etc. In some embodiments, the one or more trained neural network models may include a multi-scale and pyramid network-based model, a recurrent neural network-based model, an attention-based models, a generative adversarial network model, and the like. More description of the acquisition of the model, may be found in FIG. 8 and description thereof.

Determining the target blood vessel or a portion thereof from the image data may include determining, from the image data, information of the target blood vessel or a portion thereof (e.g., the first portion of the branches and/or the second portion of the branches trunk). The information of the determined target blood vessel or a portion thereof (e.g., the first portion of the branches and/or the second portion of the branches) may be characterized in the image data. For example, determining the first portion of the branches from the image data may include determining an image representation of the first portion of the branches. As another example, determining the first portion of the branches from the image data may include determining a position of a voxel or pixel corresponding to the first portion of the branches in the image data and marked with the position. As still another example, determining the first portion of the branches from the image data may include determining a voxel value or pixel value corresponding to the first portion of the branches in the image data.

In some embodiments, determining the target blood vessel or a portion thereof from the image data may include extracting information of the target blood vessel or a portion thereof from the image data to obtain the extracted target image data of the target blood vessel or a portion thereof. In some embodiments, the target image data may include three-dimensional position data corresponding to the extracted target blood vessel or a portion thereof. In some embodiments, the target image data may include a grayscale image corresponding to the extracted target blood vessel or a portion thereof. In some embodiments, the target image data may include a three-dimensional mask image corresponding to the extracted target blood vessel or a portion thereof, and the like. For example, determining the first portion of the plurality of branches of the target blood vessel from the image data may refer to extracting the first portion of the plurality of branches of the target blood vessel from the image data to obtain target image data including the extracted first portion of the branches. In some embodiments, the target image data may include three-dimensional position data corresponding to the first portion of the branches of the extracted target blood vessel. In some embodiments, the target image data may include a grayscale image corresponding to the first portion of the branches of the extracted target blood vessel branch. In some embodiments, the target image data may include a three-dimensional mask image corresponding to the first portion of the branches of the extracted target blood vessel, and the like.

In some embodiments, determining the first portion of the branches from the image data may include determining the first portion of branches of the arterial blood vessel from the image data. In some embodiments, determining the first portion of the branch from the image data may include determining the first portion of the venous blood vessel from the image data. In some embodiments, determining the first portion of the branches from the image data may include determining the first portion of branches of the arterial blood vessel and the first portion of branches of the venous blood vessel from the image data. In some embodiments, determining the first portion of branches of the arterial blood vessel (e.g., the main branch of the arterial blood vessel) and the first portion of branches of the venous blood vessel (e.g., the main branch of the venous blood vessel) from the image data may include separating the first portion of branches of the arterial blood vessel and the first portion of branches of the venous blood vessel. In other words, determining the first portion of branches of the arterial blood vessel (e.g., the main branch of the arterial blood vessel) and the first portion of branches of the venous blood vessel (e.g., the main branch of the venous blood vessel) from the image data may include classifying the first portion of the branches of the image data into the first portion of branches of the arterial blood vessel (e.g., the main branch of the arterial blood vessel) and the first portion of branches of the venous blood vessel (e.g., the main branch of the venous blood vessel). For example, the target image data corresponding to the first portion of the branches may include the first portion of branches of the venous blood vessel and the first portion of branches of the arterial blood vessel marked respectively, so as to distinguish the first portion of branches of the venous blood vessel and the first portion of the arterial blood vessel in the target image data.

In some embodiments, the processing device 120A may input the image data into at least one of the one or more trained neural network models to obtain target image data corresponding to the first portion (e.g., the arterial trunk images and venous trunk images, images including arterial trunk and venous trunk or images including arterial trunk, venous trunk, portion of arterial thin branches and/or portion of venous thin branches).

In some embodiments, the processing device 120A may process the image data to obtain processed image data. In some embodiments, a spatial resolution of the processed image data may be less than the spatial resolution of the image data. For example, the image data may be resampled to obtain low spatial resolution image data. The low spatial resolution image data may be acquired by resampling. The low spatial resolution image data may have less pixels and occupy less video memory, which may improve a calculation speed of determination of the arteriovenous trunk. In some embodiments, the spatial resolution of the processed image data may be higher than the spatial resolution of the image data. For example, the image data may be resampled to obtain high spatial resolution image data. The high spatial resolution image data may be acquired by resampling, and the high spatial resolution image data may have a large count of pixels, and the image definition may be high, which can improve the accuracy of determining the arterial and venous trunks. The processing device 120A may determine the first portion of the branches from the processed image data based on at least one of the one or more trained neural network models. For example, the processing device 120A may input the processed image data into at least one of the one or more trained neural network models to obtain the target image data corresponding to the first portion of the branches (for example, the arterial trunk image and the venous trunk image, images including arterial and venous trunks, images including arterial trunks, venous trunks, arterial thin branches, and venous thin branches).

In some embodiments, the processing device 120A may process the image data to determine a region of interest (ROI) in the image data and determine the first portion of the branches based on the region of interest and the at least one of the one or more trained neural network models. The region of interest may include the target blood vessel. The region of interest includes the target blood vessel may mean that the region of interest includes the region of the target blood vessel in the image data and a physical space range represented by the region of interest is greater than or equal to a physical space range of the target blood vessel.

In some embodiments, the one or more trained neural network models may include the first segmentation model, and the processing device 120A may determine the region of interest in the first image based on the first segmentation model. For example, the processing device 120A may perform a first operation on the image data to obtain a first image; segment the first image based on the first segmentation model to obtain an overview of the target blood vessel in the first image; and determine the region of interest based on the overview of the target blood vessel in the first image.

In some embodiments, the maximum connected region of the overview of the target blood vessel may be determined in the first image and used as the region of interest. In some embodiments, determining the region of interest based on the overview of the target blood vessel may include expanding the region where the overview of the target blood vessel is located in the first image to obtain the region of interest. In some embodiments, the region of interest may be a region enclosed by a smallest rectangular box that is able to enclose the overview of the target blood vessel. The overview of the target blood vessel may refer to an approximate outline of the target blood vessel.

In some embodiments, a spatial resolution of the first image may be smaller than a spatial resolution of the image data, and the first image may be referred to as a low-resolution image. In some embodiments, a pixel or voxel count in the first image may be smaller than a pixel or voxel count in the image data. In some embodiments, the first operation may be used to reduce the count of pixels in the image data.

In some embodiments, the first operation may include a resampling operation. The resampling may be performed by an interpolation algorithm, a binning operation, or the like. In some embodiments, the second operation may include image smoothing processing, image noise reduction processing, a filtering operation, and the like.

In some embodiments, the processing device 120A may segment the first image based on an image segmentation technique to determine the overview of the target blood vessel. Exemplary image segmentation techniques may include a threshold-based segmentation technique, a region-based segmentation technique, an edge-based segmentation technique, and the like.

In some embodiments, the one or more trained neural network models may include a second segmentation model, and the processing device 120A may determine the first portion of the plurality of branches of the target blood vessel based on the second segmentation model and the region of interest. In some embodiments, the processing device 120A may extract the region of interest from the image data to obtain the second image, perform a second operation on the second image to obtain the third image, and determine the region of interest in the third image based on the second segmentation model first portion. In some embodiments, the processing device 120 may input the third image into the second segmentation model to obtain the target image data corresponding to the first portion of the branches (e.g., an arterial trunk image and a venous trunk image, an image including an arterial trunk and a venous trunk, and images including arterial trunks, venous trunks, arterial branches, and venous branches).

In some embodiments, the size of the first image may be equal to the size of the image data. The processing device 120A extracting the region of interest from the image data may include that the processing device 120A extracting the region corresponding to the region of interest from the image data through a cropping operation. A location of the region of interest in the first image may be the same as a location of the region of interest in the image data.

In some embodiments, the spatial resolution of the third image may be greater than the spatial resolution of the image data. The third image may also be referred to as a high-resolution image. In some embodiments, the pixel or voxel count in the third image may be greater than the pixel or voxel count in the image data. In some embodiments, the first operation may be to increase the count of pixels in the image data.

In some embodiments, the second operation may include a resampling operation. In some embodiments, the resampling operation may be performed by an interpolation algorithm. In some embodiments, the second operation may be implemented by an algorithm such as an iterative back projection, a convex set projection, a maximum a posteriori probability method, a manifold learning, a sparse coding method, and a deep learning technology to reduce the resolution of the image data.

In some embodiments, the processing device 120A may preprocess the image data, and then use the preprocessed image data as an input to the at least one of the one or more trained neural network models to obtain corresponding target image data (e.g., the arterial trunk images and venous trunk images, images including arterial trunk and venous trunk, images including arterial trunk, venous trunk, arterial thin branches, and venous thin branches). Preprocessing the image data may include noise reduction processing, image enhancement processing, image smoothing processing, image normalization processing and the like on the image data.

In 406, the processing device 120A may determine the second portion of the plurality of branches of the target blood vessel from the image data based on the one or more constraint conditions. At least one of the second portion of the branches may be a branch structure of the first portion of the branches. In some embodiments, operation 406 may be performed by the second portion determination module 306.

In some embodiments, determining the second portion of the plurality of branches of the target blood vessel from the image data may include extracting the second portion of the plurality of branches of the target blood vessel from the image data to obtain target image data including the extracted second portion of the plurality of branches. In some embodiments, the target image data of the second portion of the plurality of branches may include three-dimensional position data corresponding to the second portion of the plurality of branches of the extracted target blood vessel. In some embodiments, the target image data of the second portion of the plurality of branches may include a grayscale image corresponding to the second portion of the plurality of branches of the extracted target blood vessel. In some embodiments, the target image data of the second portion of the plurality of branches may include a three-dimensional mask image corresponding to the second portion of the plurality of branches of the extracted target blood vessel, and the like.

In some embodiments, determining the second portion of the plurality of branches from the image data may include determining the second portion of the plurality of branches of the arterial blood vessel from the image data. In some embodiments, determining the second portion of the plurality of branches from the image data may include determining the second portion of the plurality of branches of the venous blood vessel from the image data. In some embodiments, determining the second portion of the plurality of branches from the image data may include determining the second portion of branches of the arterial blood vessel and the second portion of branches of the venous blood vessel from the image data. In some embodiments, determining the second portion of branches of the arterial blood vessel from the image data (e.g., the one or more thin branches of the arterial blood vessel) and the second portion of branches of the venous blood vessel (e.g., the one or more thin branches of the venous blood vessel) may include second portion of the branches separating the arterial blood vessel and second portion of the branches separating the venous blood vessel. In other words, determining the second portion of branches of the arterial blood vessel (e.g., the one or more thin branches of the arterial blood vessel) and the second portion of branches of the venous blood vessel (e.g., the one or more thin branches of the venous blood vessel) from the image data may include classifying the second portion of the branches of the image data into the second portion of branches of the arterial blood vessel (e.g., the thin branches of the arterial blood vessel) and the second portion of branches of the venous blood vessel (e.g., the one or more thin branches of the venous blood vessel).

The one or more constraint conditions may be used to constrain or define the target blood vessel. At least one of local features or global features of the target blood vessel determined based on the second portion of the branches and the first portion of the branches may satisfy the one or more constraint conditions. In some embodiments, the one or more constraint conditions may be used to constrain the second portion of the branches in a process of determining the second portion of the branches such that the at least one of the local features or the global features of the target blood vessel satisfies the one or more constraint conditions. The one or more constraint conditions may provide reference values corresponding to the global features or local features (also referred to as reference global features or reference local features).

The local features of the target blood vessel may be related to features of each branch (or segment) of the target blood vessel. In some embodiments, the local features of the target blood vessel may include a total count of the a plurality of branches, a size of the plurality of branches, an angle between two adjacent branches, a change rule of sizes of the plurality of branches, a change rule of pixel values (or voxel values) corresponding to a plurality of branches in the image data, a distribution relationship of the plurality of branches of different target blood vessels (i.e., the arterial blood vessel and venous blood vessel), a distribution relationship of intersection points of different target blood vessels (i.e., the arterial blood vessel and venous blood vessel, etc.). The intersection points of different target blood vessels (i.e., the arterial blood vessel and venous blood vessel) may refer to positions where the different target blood vessels overlap. For example, the arterial blood vessel and the venous blood vessel may stick together to form one or more adhesion points, also known as intersection points.

The one or more constraint conditions related to the local features may include that a total count of the plurality of branches of the same target blood vessel (e.g., the arterial blood vessel or the venous blood vessel) is less than a first count threshold (a maximum count) and/or greater than a second count threshold (i.e., a minimum count), diameters of the plurality of branches of the same target blood vessel may be larger than a first diameter threshold (i.e., a minimum diameter) and/or smaller than a second diameter threshold (i.e., a maximum diameter), an included angle between two adjacent branches of the same target blood vessel is smaller than a first included angle threshold (that is, a maximum included angle) and/or greater than a second included angle threshold (that is, a minimum included angle), the diameters of the plurality of branches of the same target blood vessel gradually decrease from an upstream branch to a downstream branch, pixel values (or voxel values) corresponding to the plurality of branches of the same target blood vessel in image data change uniformly, the branches of the target blood vessel and other subjects (such as trachea) go together (that is, the branches of the target blood vessel and branches of other subjects may be adjacent and in a substantially same direction). As described herein, two adjacent branches may include two disjoint branches, for example, approximately parallel branches of the arterial blood vessel and the venous blood vessel, or two intersecting branches, for example, branches of intersecting arterial blood vessel or the venous blood vessel, two interconnected arterial blood vessel branches, or two interconnected venous blood vessel branches.

The global features of the target blood vessel may be related to properties of the target blood vessel as a whole. In some embodiments, the global features of the target blood vessel may include an overall structure, an overall shape, a size, a location, positional relationships (direction, distance, etc.), of the target blood vessel with other surrounding subjects, relationships between different target blood vessels, and the like. One or more constraint conditions related to the global features may include that the overall structure is a tree-like structure, a maximum size of the entire tree-like structure (which may refer to a length or width of the tree-like structure) is smaller than a size threshold or greater than another size threshold, the same target blood vessel is continuous, different target blood vessels are independent and not connected, the same target blood vessel has uniqueness, etc.

In some embodiments, the one or more constraint conditions may be related to the target blood vessel determined from the image data. Determining the target blood vessel from the image data may include determining one of an arterial blood vessel or a venous blood vessel, identifying an arterial blood vessel and a venous blood vessel without distinguishing the arterial blood vessel and the venous blood vessel, identifying an arterial blood vessel and a venous blood vessel and distinguishing the arterial blood vessel and the venous blood vessel (the arterial blood vessel and venous blood vessel need to be differentiated and marked) etc. The one or more constraint conditions of the arterial blood vessel or the venous blood vessel that needs to be determined from the image data may also be referred to as a constraint condition 1, one or more constraint conditions of the arterial blood vessel or the venous blood vessel that need to be determined from the image data and not to be distinguished may also be referred to as a constraint condition 2, one or more constraint conditions of the arterial blood vessel or the venous blood vessel in the target blood vessel that need to be determined from the image data and to be distinguished may also be referred to as the constraint condition 3. The constraint condition 1 may include that diameters of the plurality of branches of a same target blood vessel gradually decrease from the upstream branch to the downstream branch, the included angle between two adjacent branches is greater than the second included angle threshold, the pixel values (or voxel values) corresponding to the plurality of branches of the target blood vessel change uniformly, and the branches of the target blood vessel (for example, the arterial blood vessel) and branches of other subjects (for example, the trachea) accompany (that is, branches of the target blood vessel and the branches of other bodies can be adjacent and in approximately the same direction), an overall structure of a same blood vessel is a tree-like structure, the same target blood vessel is continuous, and so on. The constraint condition 2 may include pixel values (or voxel values) corresponding to the plurality of branches of the same target blood vessel in the image data change uniformly, a total count of the plurality of branches of a same target blood vessel (for example, the arterial blood vessel or venous blood vessel) is smaller than the first count threshold (the maximum count) and/or greater than the second count threshold (i.e., the minimum count), the diameters of the plurality of branches of the same target blood vessel are larger than the first diameter threshold (i.e., the minimum diameter) and/or smaller than the second diameter threshold (i.e., the maximum diameter). The constraint condition 3 may include that the diameters of the plurality of branches of the same target blood vessel gradually decrease from the upstream branch to the downstream branch, the included angle between two adjacent branches is smaller than the first included angle threshold, the branches of the target blood vessel (e.g., the arterial blood vessel) and branches of other subjects (e.g., the trachea) can accompany (that is, the branches of the target blood vessel and the branches of other bodies can be adjacent and in approximately the same direction), the overall structure of the same vessel is a tree-like structure, the same target blood vessel is continuous, different target blood vessels are independent and unconnected, the same target blood vessel is unique, etc.

In some embodiments, the image segmentation techniques may be used to segment the image data based on one or more constraint conditions to determine the second portion of the plurality of branches. The image segmentation techniques may include a threshold-based segmentation technique, a boundary-based segmentation technique, a region-based segmentation technique, and a segmentation technique combined with a specific theory and tool. The boundary-based segmentation technique may include a model-based algorithm or an edge detection-based algorithm. The region-based segmentation techniques may include a region growing algorithm (e.g., a tracking algorithm), a clustering-based segmentation algorithm, and the like. A segmentation technique combined with a specific theory and tool may include an artificial intelligence-based algorithm, a neural network model-based algorithms, a genetic algorithm, and the like. In some embodiments, the one or more constraint conditions may be expressed as models, functions, etc., added to the image segmentation techniques to segment the second portion of the plurality of branches.

In some embodiments, the processing device 120 may determine end position information of the first portion of the branches in the image data. The processing device 120 may use a tracking algorithm to determine the second portion of the branches based on the one or more constraint conditions and the end position information of the first portion. In a process of tracing the second portion of the branches, one or more constraint conditions may be added to define or constrain the second portion of the branches so that the one or more constraint conditions are satisfied. For example, the processing device 120 may extract a lung outline. The processing device 120 may acquire segmented intrapulmonary portions of the pulmonary arterial trunk and the pulmonary venous trunk, and perform outline optimization on the intrapulmonary portions. The processing device 120 may determine terminal points and terminal directions of the pulmonary arterial trunk and the pulmonary venous trunk in the lung, and use a blood vessel tracking algorithm to track unsegmented blood vessel branches after the terminal points. In the tracking process, based on the one or more constraint conditions, it may avoid tracking from the pulmonary artery to the pulmonary vein or from the pulmonary vein to the pulmonary artery, and at the same time an extraction and segmentation of terminal thin branch blood vessels of the pulmonary artery and the pulmonary vein.

In some embodiments, the processing device 120A may extract the second portion of the branches from the image data using the image segmentation technique (e.g., based on the one or more constraint conditions). The processing device 120A may determine intersection points (also referred to as adhesion points) between the second portion of branches of the arterial blood vessel and the second portion of branches of the venous blood vessel from the segmented second portion of the branches based on the one or more constraint conditions. It should be noted that the intersection points between the second portion of branches of the arterial blood vessel and the second portion of branches of the venous blood vessel may refer to the intersection points connecting one or more branches of the arterial blood vessel and one or more branches of the venous blood vessel in the image data. However, within an actual physical space range, the branches of the arterial blood vessel and the branches of the venous blood vessel on both sides of the intersection points may overlap in space at the intersection points. The processing device 120A may differentiate between the second portion of branches of the arterial blood vessel and the second portion of branches of the venous blood vessel based on the intersection points. For example, the blood vessel branches on both sides of the intersection points may belong to the arterial blood vessel and the venous blood vessel, respectively.

In some embodiments, the processing device 120A may construct an energy term network based on the extracted second portion of the branches and one or more constraint conditions. Adjacent nodes in the energy term network may correspond to two adjacent branches, a connection between the adjacent nodes may be represented by an energy term, and a value of the energy term may represent a difference between the local features of the two adjacent branches and one or more constraint conditions related to the local features. If the difference is larger, a possibility that the two adjacent branches belong to different blood vessels may be larger. If the difference is smaller, a possibility that the two adjacent branches belong to the same blood vessel may be larger. The energy item may include a plurality of sub-items corresponding to a plurality of different local features, and the value of the energy item may be a weighted sum of the plurality of sub-items. For example, the local features of two adjacent branches may be represented as a vector, and reference local features under the one or more constraint conditions may be represented as a reference vector. By determining a distance between the vector representing the local features of the two adjacent branches and the reference vector under the one or more constraint conditions related to the local features, a difference between the local features of two adjacent branches and the one or more constraint conditions related to the local features may be determined. In some embodiments, the reference vector and the vector may refer to different weighting coefficients, respectively. The processing device 120A may further determine an optimal solution of the energy term network based on the global features of the arterial blood vessel or the venous blood vessel (e.g., blood vessel continuity, symmetry), and the optimal solution of the energy term network may be such that when the energy term network disconnects or unwinds along one or more target nodes, two disconnected portions of the energy term network may correspond to an actual (or real) venous blood vessel and an actual (or real) arterial blood vessel, respectively, and the one or more target nodes may be intersection points of the arterial blood vessel and venous blood vessel. On either side of the intersection points may be the arterial blood vessel or the venous blood vessel.

In some embodiments, the processing device 120A may preprocess the image data, and then extract the second portion based on the preprocessed image data to obtain target image data corresponding to the second portion (e.g., an arterial thin blood vessel image and a venous thin blood vessel image, images including arterial thin blood vessels and venous thin blood vessels). Preprocessing the image data may include the noise reduction processing, image enhancement processing, image smoothing processing, image normalization processing and the like on the image data.

In 408, the processing device 120A may determine the target blood vessel based on the first portion of the branches and the second portion of the branches. In some embodiments, operation 408 may be performed by the target blood vessel determination module 308.

In some embodiments, determining the target blood vessel may include extracting the target blood vessel from the image data to obtain target image data including the extracted target blood vessel. For example, gray values of other pixels or voxels in the image data that do not belong to the target blood vessel may be set to 0 to extract the target blood vessel in the image data, thereby obtaining the target image data. In some embodiments, the target image data of the target blood vessel may include three-dimensional position data corresponding to the extracted target blood vessel. In some embodiments, the target image data of the target blood vessel may include a grayscale image corresponding to the extracted target blood vessel. In some embodiments, the target image data of the target blood vessel may include a corresponding three-dimensional mask image of the extracted target blood vessel, and the like.

In some embodiments, the target image data of the target blood vessel may be determined based on the target image data of the first portion of the branches and the target image data of the second portion of the branches. For example, the target image data of the target blood vessel may be determined by combining the target image data of the first portion of the branches and the target image data of the second portion of the branches.

It should be noted that the above description of process 400 is provided for illustration purposes only, and is not intended to limit the scope of the present disclosure. For those of ordinary skill in the art, various changes and modifications can be made based on the description of the present disclosure. However, these changes and modifications do not depart from the scope of this disclosure. In some embodiments, process 400 may include one or more additional operations, or one or more operations described above may be omitted. For example, process 400 may include one or more additional operations (e.g., one or more operations of process 500). In some embodiments, operations and operations may be integrated into a single operation. For example, operation 408 may be integrated into operation 406.

In some embodiments, the processing device 120A may determine, based on one or more trained neural network models, a plurality of branches (e.g., an arterial blood vessel trunk and thin trunks, a venous blood vessel trunk and thin trunks, arteriovenous trunks and thin trunks) of the target blood vessel in the image data. For example, the processing device 120A may input the image data or processed image data into a trained neural network model, and the trained neural network model may output an image including the target blood vessel. In some embodiments, the trained neural network model may output images including the arterial blood vessel and the venous blood vessel. In some embodiments, the trained neural network model may output images including the arterial blood vessel or the venous blood vessel and highlight or mark the arterial blood vessel or the venous blood vessel in the images, respectively. In some embodiments, the processing device 120A may input one or more constraint conditions and the image data into the trained neural network model to determine a plurality of branches of the target blood vessel in the image data, for example, a plurality of branches of the arterial blood vessel and a plurality of branches of the venous blood vessel.

In some embodiments, the initial neural network model may be trained based on one or more constraint conditions to obtain the trained neural network model. For example, a loss function of the initial neural network model may include a regular term, and the regular term may be constructed based on one or more constraint conditions to constrain a difference between the local features and the reference local features and/or a difference between global features of the target blood vessel and reference global features corresponding to the one or more constraint conditions. For more description about the training of the initial neural network model, see the detailed description in FIG. 8.

Figure 5:
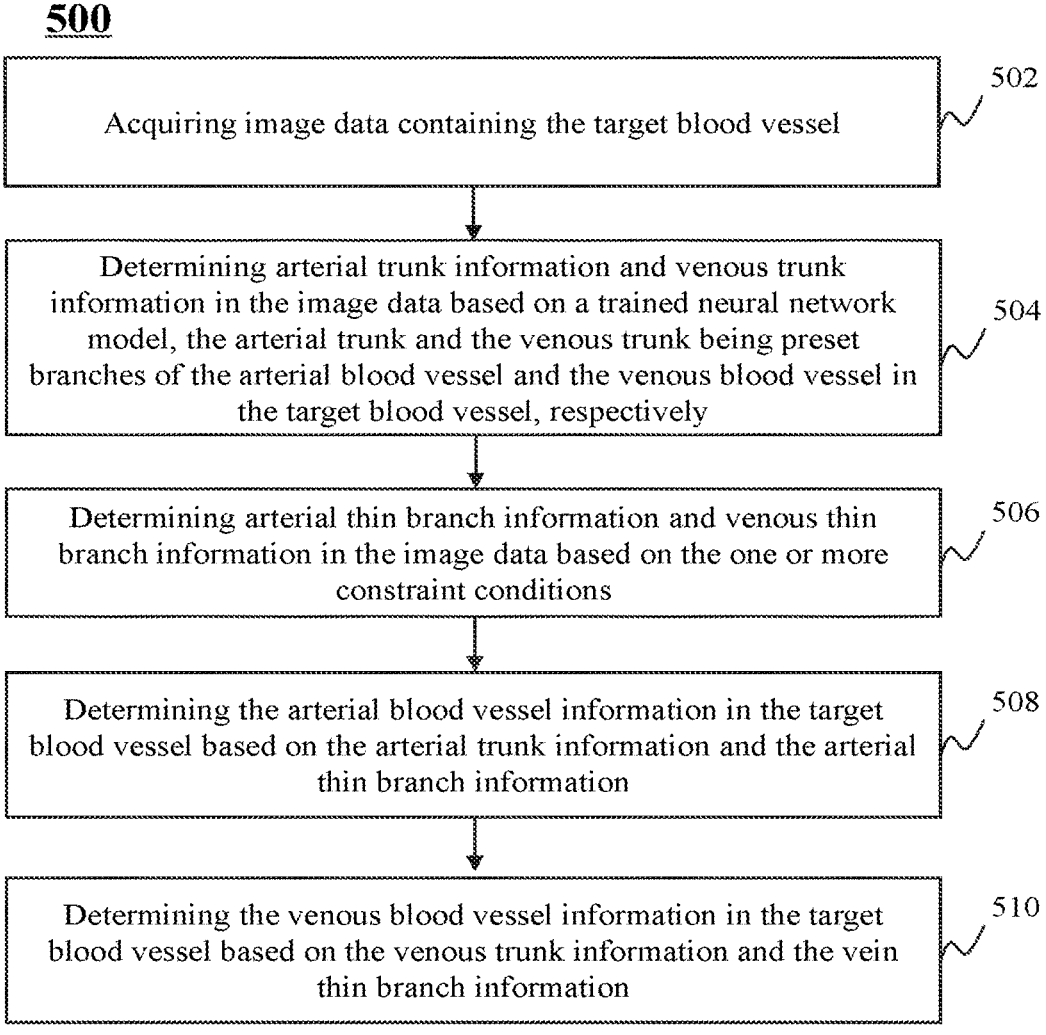
FIG. 5 is a flowchart of a process for determining an artery and vein according to some embodiments of the present disclosure.

FIG. 5 is a flowchart of a process for determining an artery and vein according to some embodiments of the present disclosure. Process 500 may be applied to a situation where it is necessary to determine the artery and vein of the target blood vessel in a medical image. The process 500 may be performed by the processing device 120 (e.g., the processing device 120A) or by the computing device 200. For example, process 500 may be implemented as a set of instructions (e.g., an application program) stored, e.g., in the storage device 130, the memory 228, the memory external to and accessible by the image processing system. The processing device 120 or the computing device 210 may execute an instruction set and, when executing the instruction set, the processing device 120 or the computing device 210 may be configured to execute process 500. Operations of process 500 presented below are intended to be illustrative. In some embodiments, the process may be accomplished using one or more additional operations not described and/or one or more operations not discussed. Additionally, a sequence of operations of process 500 is illustrated in FIG. 5 and descriptions below are not intended to be restrictive.

In 502, the processing device 120A may acquire image data containing the target blood vessel. In some embodiments, operation 502 may be performed by the acquisition module 302.

In some embodiments, the target blood vessel may be a blood vessel at any portion of the target object (the target object may be a human body or an animal, etc.). For example, the target blood vessel may be at least one of a pulmonary blood vessel, a liver blood vessel, or a spleen blood vessel. In some embodiments, the target blood vessel may include the arterial blood vessel and the venous blood vessel. For example, the pulmonary blood vessels may include a pulmonary arterial blood vessel and a pulmonary venous blood vessel, and the hepatic vessels may include a hepatic arterial blood vessel and a hepatic venous blood vessel, and the like.

In some embodiments, the image data may be a medical image of the target blood vessel acquired using medical imaging techniques. In some embodiments, the medical imaging technique may be a vascular imaging technique. The vascular imaging techniques may include CTA (computed tomography angiography), MRA (magnetic resonance angiography), DSA (digital subtraction angiography), and the like. The image data may be three-dimensional data corresponding to a multi-layer initial tomographic image, or may be the three-dimensional data corresponding to the three-dimensional image acquired by reconstructing the multi-layer initial tomographic image. In some embodiments, the image data may correspond to a CTA image sequence with fewer slices. In some embodiments, the image data may correspond to a CT image sequence with many slices. For example, the image data may be three-dimensional data corresponding to a CT image sequence including pulmonary blood vessels.

In some embodiments, the medical image corresponding to the target blood vessel may be acquired by using the medical imaging technique. For example, if the medical imaging technique is a CT tomography technique, and the target blood vessel is a pulmonary blood vessel, the CT tomography technique may be used to obtain an initial medical image sequence corresponding to the pulmonary blood vessel to obtain the image data. The processing device 120A may read the image data directly from the corresponding storage medium. For example, a three-dimensional reconstruction of the initial medical image sequence may be performed to obtain the image data.

In 504, the processing device 120A may determine arterial trunk information and venous trunk information in the image data based on a trained neural network model. The arterial trunk and the venous trunk may be preset branches of the arterial blood vessel and the venous blood vessel in the target blood vessel, respectively. In some embodiments, the operation 504 may be performed by the first portion determination module 304.

The trained neural network model may also be referred to as a trunk extraction neural network model. In some embodiments, the trunk extraction neural network model may be a convolutional neural network model, for example, a fully convolutional neural network model or a deep convolutional neural network model, or the like. The deep convolutional neural network may include one of an encoder-decoder type symmetric deep neural network (a U-Net deep convolutional neural network, a V-Net deep convolutional neural network and a HourglassNet deep convolutional neural network) and an encoder-decoder-type asymmetric deep neural network.

In some embodiments, the preset branch may include an initial branch and a first branch of the target blood vessel. The first branch may be a portion between a first bifurcation portion and a second bifurcation portion of the target blood vessel, and the first bifurcation portion of the target blood vessel may be a portion where a first bifurcation occurs from the initial branch of the target blood vessel, the second bifurcation portion of the target blood vessel may be a portion where a first bifurcation occurs from the first bifurcation portion of the target blood vessel, and so on. A Nth bifurcation portion of the target blood vessel may be a portion where the first bifurcation occurs from a N−1th bifurcation portion of the target blood vessel. The preset branch may further include the initial branch, the first branch, and the second branch of the target blood vessel, and the preset branch may include the initial branch, the first branch, . . . and a Nth branch of the target blood vessel.

As described herein, determining the arterial trunk information and the venous trunk information in the image data may also be referred to as determining the arterial trunk and the venous trunk in the image data. Determining the arterial trunk information and venous trunk information in the image data may include identifying the arterial trunk and the venous trunk in the image data to differentiate location information of the arterial trunks and location information of the venous trunks in the image data and/or image representations (e.g., grayscale values) of the arterial trunks and image representations (e.g., grayscale values) of the venous trunks. For example, determining arterial trunk information and venous trunk information in the image data may include identifying arterial trunks and venous trunks from the image data to obtain target image data including the identified arterial trunks and venous trunks. As another example, determining the arterial trunk information and the venous trunk information in the image data may include identifying the arterial trunks and the venous trunks from the image data to obtain target image data including the identified arterial trunks (i.e., the arterial trunk image) and target image data including the identified the venous trunks (i.e., the venous trunk image). As another example, determining the arterial trunk information and the venous trunk information in the image data may include identifying the arterial trunks and the venous trunks from the image data to obtain target image data including the arterial trunks and the venous trunks. The arterial trunk and the venous trunk in the target image data may have different marks.

The term "identifying" may refer to distinguishing the arterial trunks and venous trunks in the image data from other structures or tissues. For example, identifying the arterial and venous trunks from the image data to obtain target image data including the extracted arterial trunks and venous trunks may include setting the grayscale values of other regions in the image data to 0 to 0, and the arterial trunks and the venous trunks may be individually colored to obtain target image data including the identified arterial trunks and venous trunks.

In some embodiments, the arterial trunk information and the venous trunk information may be three-dimensional position data corresponding to the arterial trunk and the venous trunk. In some embodiments, the arterial trunk information and the venous trunk information may be grayscale images corresponding to the arterial trunk and the venous trunk and with the marked arterial trunk and the marked venous trunk, respectively. In some embodiments, the arterial trunk information and the venous trunk information may be a three-dimensional mask image corresponding to the arterial trunk and the venous trunk and distinguishing the arterial trunk and the venous trunk, or the like.

In some embodiments, the image data may be used as input of the trunk extraction neural network model, and an image of the arterial trunk and an image of the venous trunk of the target blood vessel may be output. In some embodiments, the image data may be used as the input of the trunk extraction neural network model, and output of the trunk extraction neural network model may include an image including the arterial trunk, the venous trunk, and some thin branches of the target blood vessel (for example, the capillaries of the target blood vessel). An arterial trunk image and a venous trunk image may be extracted from the output image. In some embodiments, the image data may be preprocessed first, and then the preprocessed image data may be used as the input of the trunk extraction neural network model to output images of the arterial trunk and the venous trunk of the target blood vessel. In some embodiments, the preprocessed image data may be processed into blocks to obtain several preprocessed three-dimensional data blocks of the medical image. The images of the arterial trunk and the venous trunk of portions of target blood vessel corresponding to the blocks may be merged according to the merging rules, and all output images of the arterial trunk and the venous trunk of portions of the target blood vessel may be combined to obtain the images of the arterial trunk and the venous trunk of the target blood vessel.

In some embodiments, preprocessing the image data may include removing interference or noise on the image data, performing image enhancement processing on the image data, normalizing the image data, resampling the image data, etc., or a combination thereof.

In some embodiments, the processing device 120A may resample the image data based on a target physical size corresponding to a reference target voxel to obtain target resampling image data having target voxels (which may also be referred to as the preprocessed image data). The processing device 120A may input the target resampling image data into the trained neural network model (also referred to as the trunk extraction neural network model, for example, a first trunk extraction neural network model (i.e., the first segmentation model) or a second trunk extraction neural network model (i.e., the second segmentation model)) to obtain the arterial trunk image and the venous trunk image. In some embodiments, the image data may have a plurality of voxels, and each voxel may have a physical size. In some embodiments, the physical sizes of the voxels in the image data may be 1 mm×1 mm×1 mm. In some embodiments, the reference physical size of the target voxel in the target resampling image data may be larger than the physical sizes of the voxels in the image data, so that the spatial resolution of the target resampling image data may be smaller than the spatial resolution of the image data. Resampling to reduce the spatial resolution of the image data may reduce noise in the image data and improve the accuracy of identifying the arterial trunks and venous trunks. In some embodiments, before resampling the image data, the target physical size of each target voxel in the resampled target resampling image data may be preset. For example, the target physical size may be 3 mm×3 mm×3 mm, or the target physical size may be 2 mm×3 mm×4 mm, or the like. Based on the target physical size, the image data may be resampled by interpolation or combining the pixel values. In some embodiments, after obtaining the target resampling image data, the target resampling image data may be used as the input of the trunk extraction neural network model, and the arterial trunk image and the venous trunk image of the neural network model may be output. In some embodiments, after normalizing the target resampling image data to obtain normalized image data, the normalized image data may be used as the input of the trunk extraction neural network model, and the arterial trunk image and the venous trunk image may be output.

In some embodiments, the processing device 120 may resample the image data based on a first physical size corresponding to a first target voxel to obtain a first image having first target voxels; input the first image into the first trunk extraction neural network model (i.e., the first segmentation model) to obtain the overview image of the target blood vessel; determine a region of interest of the target blood vessel based on the overview image of the target blood vessel; determine the second image corresponding to the region of interest of the target blood vessel in the image data according to the region of interest of the target blood vessel; resample the second image based on the second physical size corresponding to a second target voxel to obtain a third image including second target voxels; inputting the third image into the second trunk extraction neural network model (i.e., the second segmentation model) to obtain the arterial trunk image and the venous trunk image. In some embodiments, the spatial resolution of the first image may be greater than the spatial resolution of the image data, that is, the first physical size of the first target voxel in the first image may be smaller than the physical size of the voxel in the image data. In some embodiments, the spatial resolution of the third image may be smaller than the spatial resolution of the image data, i.e., the second physical size of the second target voxel in the third image may be larger than the physical size of the voxel in the image data. For more description on the determination of the arterial trunk and the venous trunk, see the detailed description in FIG. 6.

In 506, the processing device 120A may determine arterial thin branch information and venous thin branch information in the image data based on the one or more constraint conditions. In some embodiments, operation 504 may be performed by the second portion determination module 306.

In some embodiments, the arterial thin branches and venous thin branches may be arterial blood vessels and the venous blood vessels except the preset branches in the target blood vessel, respectively. For example, the arterial thin branches and venous thin branches may only include capillaries in the target blood vessel, or may include both capillaries in the target blood vessel and other branch vessels in the target blood vessel. The other branches may include portion of preset branches of the target blood vessel, or may not include the preset branches of the target blood vessel.

As described herein, determining the arterial thin branch information and the venous thin branch information in the image data may also be referred to as determining the arterial thin branches and the venous thin branches in the image data. Determining the arterial thin branch information and the venous thin branch information in the image data may include identifying arterial and venous thin branches in the image data to differentiate location information and/or image representations (e.g., grayscale value) of the arterial thin branches and venous thin branches in the image data. For example, determining the arterial thin branch information and venous thin branch information in the image data may include identifying arterial thin branches and venous thin branches from the image data to obtain target image data including the identified arterial thin branches and venous thin branches. As another example, determining the arterial branch information and the venous branch information in the image data may include identifying the arterial thin branches and the venous thin branches from the image data to obtain target image data including the identified arterial thin branches (i.e., arterial thin branch images) and target image data of the venous thin branches (i.e., venous thin branch images). As another example, determining the arterial thin branch information and venous thin branch information in the image data may include identifying the arterial thin branches and the venous thin branches from the image data to obtain target image data including the arterial thin branches and the venous thin branches. The arterial thin branches and the venous thin branches in the target image data may have different markers.

In some embodiments, the arterial thin branch information and the venous thin branch information may be three-dimensional position data corresponding to the arterial branches and the venous branches. In some embodiments, the arterial thin branch information and the venous thin branch information may be grayscale images corresponding to the arterial branches and the venous branches and marked with the arterial branches and the venous branches, respectively. In some embodiments, the arterial thin branch information and the venous thin branch information may be three-dimensional mask images corresponding to the arterial thin branches and the venous thin branches and distinguishing the arterial thin branches and the venous thin branches, or the like.

In some embodiments, the one or more constraint conditions may be one or more constraint conditions that define arterial thin branches and venous thin branches. In some embodiments, the one or more constraint conditions may be used to constrain the blood vessel thin branches in a process of determining blood vessel thin branches information such that at least one of the local features and the global features of the target blood vessel satisfies the one or more constraint conditions. The one or more constraint conditions may relate to local and/or global features of the blood vessel.

The local features of the blood vessel may be related to features of each segment (or branch) of the blood vessel. In some embodiments, the local features of the blood vessel may include a total count of the plurality of branches of the blood vessel, sizes of the plurality of branches of the blood vessel, change rules of the sizes of the plurality of branches of the blood vessel and two adjacent branches of the blood vessel, and change rules of the pixel values corresponding to a plurality of branches of the blood vessel in the image data, a distribution relationship between a plurality of branches of different blood vessels, positions of adhesions between different blood vessels, etc. One or more constraint conditions related to the local features may include that a total count of a plurality of branches of the same vessel (e.g., artery or vein) is smaller than a maximum count and/or greater than a minimum count, and diameters of a plurality of branches of the same vessel are greater than a minimum diameter and/or smaller than a maximum diameter, an included angle between two adjacent branches of the same blood vessel is smaller than a maximum included angle and/or larger than a minimum included angle, and a size change rule of a plurality of segments of the same blood vessel satisfies a rule of smooth decrease, pixel values (or voxel values) corresponding to a plurality of branches of the same blood vessel in the image data change uniformly, and the branches of the blood vessel and the branches of other subjects (for example, the trachea) accompany (that is, the branches of the blood vessel and branches of other bodies are adjacent and in approximately the same direction) and so on.

The global features of the blood vessel may be related to properties of the whole blood vessel. In some embodiments, the global features of the blood vessel may include an overall structure, an overall shape, sizes, a position, relationships with other surrounding subjects (direction, distance, etc.) of the blood vessel, relationships between different blood vessels, and the like. The one or more constraint conditions related to the global features may include that the overall structure of the blood vessel is a tree structure, a maximum size of the entire tree structure (which can refer to the length or width of the tree structure) is smaller than or greater than a threshold, the same blood vessel is continuous, different blood vessels (for example, artery and vein) are independent and not connected, the same blood vessel is unique (a certain blood vessel can only be an artery or a vein), etc. For other detailed descriptions of the one or more constraint conditions, see detailed descriptions in FIG. 7.

In some embodiments, if the one or more constraint conditions are sufficient, the arterial thin branch information and venous thin branch information in the image data may be directly determined based on the one or more constraint conditions, and the arterial blood vessel information and venous blood vessel information of the target blood vessel may be acquired by combining the arterial trunk information and the venous trunk information with the arterial thin branch information and venous thin branch information. In some embodiments, if the one or more constraint conditions are not sufficient, the arterial thin branch information and the venous thin branch information in the image data may be determined based on the one or more constraint conditions with a help of the blood vessel segmentation technique, and the arterial blood vessel information and venous blood vessel information of the target blood vessel may be acquired by combining the arterial trunk information and the venous trunk information with arterial thin branch information and venous thin branch information. The vessel segmentation technique may include a boundary-based segmentation technique, a region-based segmentation technique, and a segmentation technique combined with a specific theory and tool. For more descriptions of the image segmentation technique, see the detailed descriptions elsewhere in the present disclosure.

In 508, the processing device 120A may determine the arterial blood vessel information in the target blood vessel based on the arterial trunk information and the arterial thin branch information. In some embodiments, operation 508 may be performed by the target blood vessel determination module 308. In some embodiments, the arterial blood vessel information may be three-dimensional position data corresponding to the arterial blood vessel. In some embodiments, the arterial blood vessel information may be a grayscale image corresponding to the arterial blood vessel and marked with the arterial blood vessel. In some embodiments, the arterial blood vessel information may be a three-dimensional mask image corresponding to the arterial blood vessel and marked with the arterial blood vessel, or the like.

In 510, the processing device 120A may determine the venous blood vessel information in the target blood vessel based on the venous trunk information and the vein thin branch information. In some embodiments, operation 510 may be performed by the target blood vessel determination module 308. In some embodiments, the venous blood vessel information may be three-dimensional position data corresponding to the venous blood vessel. In some embodiments, the venous blood vessel information may be a grayscale image corresponding to the venous blood vessel and marked with the venous blood vessel. In some embodiments, the venous blood vessel information may be a three-dimensional mask image corresponding to the venous blood vessel and marked with the venous blood vessel, or the like.

In some embodiments, the processing device 120A may combine the arterial trunk information and the arterial thin branch information to determine the arterial blood vessel information in the target blood vessel. The processing device 120A may combine the venous trunk information and the vein thin branch information to determine the vein vessel information in the target blood vessel. For example, the arterial trunk information and the arterial thin branch information may include a grayscale image of the arterial trunk and a grayscale image (or mask image, or three-dimensional position data) of the arterial thin branch. The processing device 120A may combine the grayscale image of the arterial trunk and the grayscale image of the arterial thin branch to determine the grayscale image of the arterial blood vessel in the target blood vessel. The venous trunk information and the vein thin branch information may include a grayscale image (or mask image, or three-dimensional position data) of the venous trunk and a grayscale image (or mask image, or three-dimensional position data) of the venous thin branches, respectively. The processing device 120A may combine the grayscale image of the venous trunk and the grayscale image of the venous thin branches to determine the grayscale image of the vein blood vessels in the target blood vessel. The processing device 120A may combine the arterial blood vessel image and the venous blood vessel image to obtain a grayscale image of the target blood vessel.

In some embodiments, the arterial trunk information and the venous trunk information may be grayscale images (or mask images, or three-dimensional position data) corresponding to the arterial trunk and the venous trunk and marked with the arterial trunk and the venous trunk, respectively. The arterial thin branch information and the venous thin branch information may be grayscale images (or mask images, or three-dimensional position data) corresponding to the arterial thin branches and the venous thin branches and marked with the arterial thin branches and the venous thin branches, respectively. The processing device 120A may combine grayscale images corresponding to the arterial trunks and venous trunks and grayscale images corresponding to arterial and venous thin branches to determine a grayscale image (or mask image, or three-dimensional position data) of the target blood vessel. The arterial blood vessel or the venous blood vessel may be marked in the grayscale image of the target blood vessel to distinguish the arterial blood vessel and the venous blood vessel.

In some embodiments, after obtaining the arterial blood vessel information and the venous blood vessel information of the target blood vessel, the target blood vessel may be extracted and segmented. For example, the arterial blood vessel information and the venous blood vessel information of the target blood vessel may include three-dimensional mask images corresponding to the arterial blood vessel and the venous blood vessel and marked with the venous blood vessel and the arterial blood vessel. The processing device 120A may multiply the three-dimensional mask image and the image data to segment the target blood vessel.

A method of determining the artery and vein provided in the embodiment may include acquiring the image data including the target blood vessel; determining the arterial trunk information and the venous trunk information in the image data based on the trained trunk extraction neural network model, the arterial trunks and the venous trunks being the arterial blood vessel and venous blood vessel of preset branches in the target blood vessel respectively; determining the arterial thin branch information and the venous thin branch information of the target blood vessel in the image data based on the one or more constraint conditions, and acquiring the arterial blood vessel information and the venous blood vessel information of the target blood vessel by combining the arterial trunk information and the venous trunk information. By combining a neural network and blood vessel processing technique, using the trained neural network to directly segment main blood vessels of the pulmonary artery and pulmonary vein, which completes a separation task of adhesions of main branches of the pulmonary artery and pulmonary vein with improved accuracy. Using the blood vessel processing technique to deal with thin blood vessels that cannot be accurately identified by a deep neural network model can separate the arterial blood vessel from the venous blood vessel quickly, accurately, and completely.

It should be noted that the above description of process 500 is provided for illustration purposes only, and is not intended to limit the scope of the present disclosure. For those of ordinary skill in the art, various changes and modifications may be made based on the description of the present disclosure. However, these changes and modifications do not depart from the scope of this disclosure. In some embodiments, process 500 may include one or more additional operations, or one or more operations described above may be omitted. For example, operations and operations may be integrated into one operation. As another example, process 500 may include one or more additional operations (e.g., one or more operations of the process 600). In some embodiments, operations and operations may be integrated into a single operation. For example, operation 508 and operation 510 may be integrated into a single operation. For example, the processing device 120 may determine the target blood vessel information based on the arterial trunk information, the venous trunk information, the arterial thin branch information, and the venous thin branch information.

Figure 6:
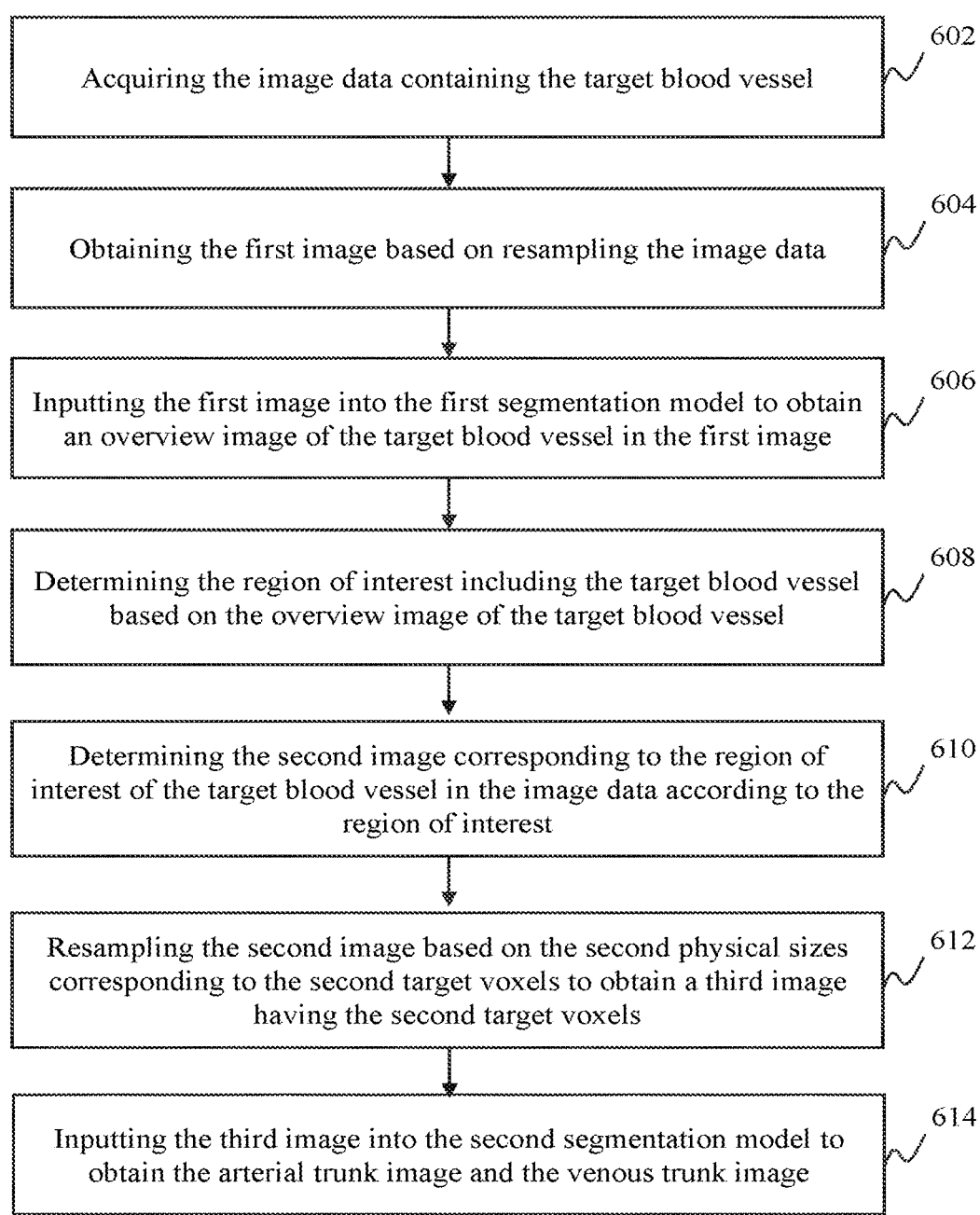
FIG. 6 is a flowchart of a process for determining arterial and venous trunk information according to some embodiments of the present disclosure.

FIG. 6 is a flowchart of a process for determining arterial trunk information and venous trunk information according to some embodiments of the present disclosure. Process 600 may be applied to a situation where it is necessary to determine the artery of the target blood vessel and the vein of the target blood vessel in the medical image. The process 600 may be performed by the processing device 120 (e.g., the processing device 120A) or by the computing device 200. For example, the process 600 may be implemented as an instruction set (e.g., an application program) stored, e.g., in the storage device 130, the memory 228, the memory external to and accessible by the image processing system. The processing device 120 or the computing device 200 may execute the instruction set and, when executing the instruction set, the processing device 120 or the computing device 210 may be configured to execute process 600. Operations of process 600 presented below are intended to be illustrative. In some embodiments, the process may be accomplished using one or more additional operations not described and/or one or more operations not discussed. Additionally, a sequence of operations of process 600 illustrated in FIG. 6 and described below is not intended to be restrictive. Operation 504 in FIG. 5 may be performed according to process 600.

In 602, the processing device 120 acquiring the image data containing the target blood vessel. In some embodiments, operation 602 may be performed by the acquisition module 302. More descriptions regarding the image data of the target blood vessel may refer to operation 502 in FIG. 5.

In 604, the processing device 120 may obtain the first image based on resampling the image data. The spatial resolution of the first image may be smaller than the spatial resolution of the image data. In some embodiments, the operation 604 may be performed by the first portion determination module 304. The spatial resolution may denote a size of an actual physical space range that a pixel or voxel in an image can represent. The smaller the actual physical space range that the pixel or voxel in the image can represent, the larger the spatial resolution may be; the larger the actual physical space range that the pixel or voxel in the image can represent, the smaller the spatial resolution may be. A relatively higher resolution may represent an image that is clearer and has more voxels; a relatively low resolution may represent an image that is blurrier and rougher and has fewer voxels. At the same image size, a pixel (or voxel) size in a high-resolution image may be smaller than the pixel (or voxel) size in a low-resolution image.

In some embodiments, the processing device 120 may resample the image data to obtain a first image having the first target voxels (e.g., the image a in FIG. 10) based on the first physical sizes corresponding to the first target voxels. In some embodiments, first physical sizes of the first target voxels in the first image may be larger than the physical sizes of the voxels in the image data. In some embodiments, the physical sizes of the voxels in the image data may be 1 mm×1 mm×1 mm, or 2 mm×2 mm×2 mm, or 1 mm×2 mm×3 mm, or the like. After resampling the image data, the first physical sizes of each first target voxel in the resampled first image may be determined. Exemplarily, the first physical sizes may be 5 mm×5 mm×5 mm, or the first physical sizes may be 5 mm×6 mm×7 mm, or the like. Based on the first physical sizes, the image data may be resampled by a technique of interpolating and/or combining pixel values.

In 606, the processing device 120 may input the first image into the first segmentation model to obtain an overview image of the target blood vessel in the first image. In some embodiments, the operation 606 may be performed by the first portion determination module 304.

The overview image of the target blood vessel (e.g., the image b in FIG. 10) may include a rough outline of the target blood vessel. In some embodiments, the overview image of the target blood vessel may be a grayscale image of the target blood vessel. In some embodiments, the overview image of the target blood vessel may be a mask image of the target blood vessel. In some embodiments, the target blood vessel may include the arterial blood vessel and the venous blood vessel. In some embodiments, the overview image of the target blood vessel may include a grayscale or mask image that does not differentiate outlines of the arterial blood vessel and venous blood vessel. In some embodiments, the overview image of the target blood vessel may include a grayscale or mask image that distinguishes the outlines of the arterial blood vessel and venous blood vessel. In some embodiments, the overview image of the target blood vessel may include trunk information of the target blood vessel (e.g., the arterial trunk information and venous trunk information), several discontinuous thin blood vessels, and other portions that are wrongly segmented.

The first segmentation model may include a convolutional neural network model. For example, the first segmentation model may be a full convolutional neural network model or a deep convolutional neural network model, or the like. The deep convolutional neural network may include any of an encoder-decoder type symmetric deep neural network (a U-Net deep convolutional neural network, a V-Net deep convolutional neural network and a HourglassNet deep convolutional neural network) and an encoder-decoder-type asymmetric deep neural network. For a detailed description of the structure and training of the first segmentation model, see FIG. 8 and FIG. 9A and FIG. 9B.

Figure 10:
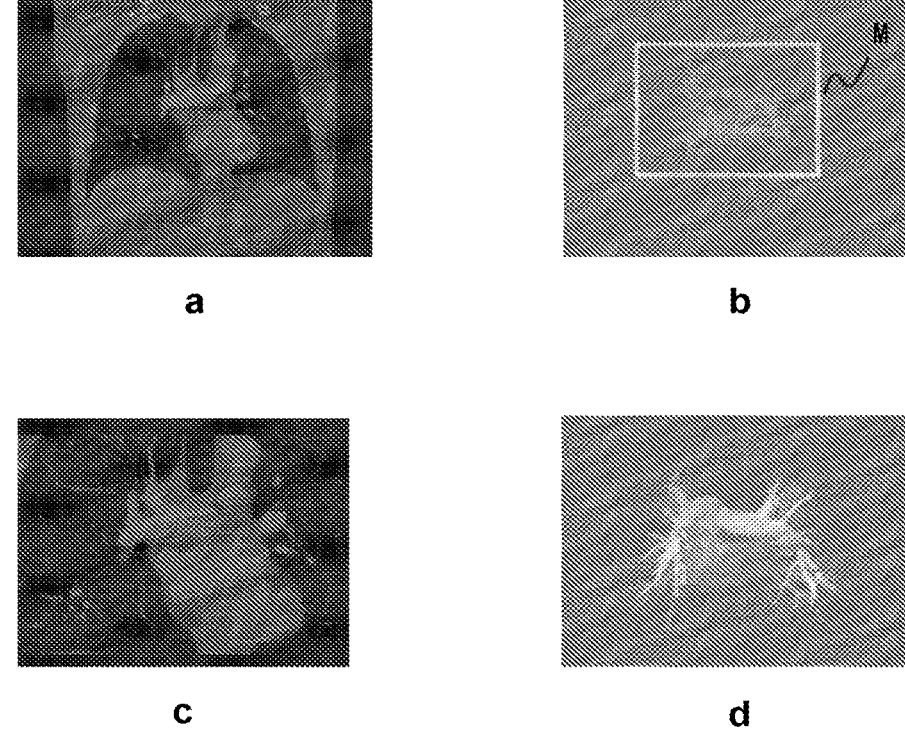
FIG. 10 is a schematic diagram of segmentation of a pulmonary venous trunk according to some embodiments of the present disclosure.

In 608, the processing device 120 may determine the region of interest of the target blood vessel based on the overview image of the target blood vessel (a region where a block M is located in the image b in FIG. 10). In some embodiments, the operation 608 may be performed by the first portion determination module 304. In some embodiments, the processing device 120 may designate a region where the target blood vessel is located (i.e., a region surrounded by the outline) in the overview image of the target blood vessel as the region of interest of the target blood vessel. In some embodiments, the processing device 120 may designate the region where the target blood vessel is located (i.e., the region surrounded by the outline) in the target blood vessel overview image after removing other portions that are incorrectly segmented as the region of interest of the target blood vessel. In some embodiments, the processing device 120 may designate the largest connected area of the region where the target blood vessel is located (i.e., the region surrounded by the outline) in the overview image of the target blood vessel as the region of interest of the target blood vessel. In some embodiments, the processing device 120 may designate a remaining portion removed discontinuous thin blood vessels and other portions that are incorrectly segmented from a region where the target blood vessel is located in the overview image of the target blood vessel (i.e., the region surrounded by the outline) as the region of interest of the target blood vessel.

In some embodiments, the maximum connected region may be determined based on a connected region analysis algorithm. Exemplary connected region analysis algorithms may include a seed filling algorithm, a two-pass algorithm, and the like.

In 610, the processing device 120 may determine the second image corresponding to the region of interest of the target blood vessel in the image data according to the region of interest of the target blood vessel. In some embodiments, the operation 610 may be performed by the first portion determination module 304.

In some embodiments, the region corresponding to the region of interest of the target blood vessel may be cut out from the image data according to the region of interest of the target blood vessel to obtain the second image. In some embodiments, the second image may be obtained by using a feature matching algorithm to match the region corresponding to the region of interest of the target blood vessel from the image data. For example, the feature matching algorithm may be used to match the image data with the overview image of the target blood vessel to determine the corresponding position (i.e., region) of the region of interest of the target blood vessel in the image data, and then intercept the corresponding position of the region of interest of the target blood vessel in the image data to obtain the second image.

In 612, the processing device 120 may resample the second image to obtain a third image. The spatial resolution of the third image (the image c in FIG. 10) may be greater than the spatial resolution of the image data. In some embodiments, the operation 612 may be performed by the first portion determination module 304.

In some embodiments, the processing device 120 may resample the second image based on the second physical sizes corresponding to the second target voxels to obtain a third image having the second target voxels. The second physical sizes of the second target voxels in the third image may be smaller than the physical sizes of the voxels in the image data. In some embodiments, the physical sizes of the voxels in the image data may be 1 mm×1 mm×1 mm, or 2 mm×2 mm×2 mm, or 1 mm×2 mm×3 mm, or the like. After resampling the image data, the second physical sizes of each second target voxel in the resampled third image may be determined. Exemplarily, the second physical sizes may be 0.5 mm×0.5 mm×0.5 mm, or the second physical sizes may be 1 mm×1 mm×1 mm, or the like. Based on the second physical sizes, the image data may be resampled by a technique of interpolating and/or combining pixel values. The second physical sizes may be the same as or different from the first physical sizes.

In 614, the processing device 120 may input the third image into the second segmentation model to obtain of the arterial trunk image and the venous trunk image. In some embodiments, the second segmentation model may output a blood vessel trunk image (e.g., the image d in FIG. 10) including the arterial blood vessel trunks and venous blood vessel trunks. The arterial blood vessel trunks and venous blood vessel trunks in the blood vessel trunk image may be marked with different colors to distinguish the arterial blood vessel trunks and venous blood vessel trunks.

In some embodiments, the first segmentation model and the second segmentation model may be the same neural network model. In some embodiments, the first segmentation model and the second segmentation model may be different neural network models. In some embodiments, the different neural network models may be neural network models with the same framework or structure, but with at least different model parameters. In some embodiments, different neural network models may refer to neural network models with different frameworks or structures and different model parameters.

For example, a framework of the second segmentation model may be the same as a framework of the first segmentation model, and model parameters corresponding to the second segmentation model may be different from model parameters of the first segmentation model. As another example, the framework of the second segmentation model may be different from the framework of the first segmentation model, and the model parameters corresponding to the second segmentation model may also be different from the model parameters of the first segmentation model.

It should be noted here that if adjacent portions of the target blood vessel (for example, the heart, the trachea) are determined or known which may help to determine the arterial blood vessel or the venous blood vessel of the target blood vessel, after inputting the third image into the second segmentation model, the arterial trunk, venous trunk, and adjacent portions of the target blood vessel may be outputs of the second segmentation model, so that the arterial thin branches and the venous thin branches in the target blood vessel can be more accurately determined later. Exemplarily, if the target blood vessel is a pulmonary blood vessel, after the third image is input into the second segmentation model, an image including the pulmonary arterial trunk, the pulmonary venous trunk and the left atrium may be acquired.

A method of determining an arterial trunk and a venous trunk provided by this embodiment may include acquiring the image data containing the target blood vessel; obtaining a first image with the first target voxels by resampling the image data based on the first physical sizes corresponding to the first target voxels; obtaining the overview image of the target blood vessel by inputting the first image into the first segmentation model; determining the region of interest of the target blood vessel based on the overview image of the target blood vessel; determining the second image corresponding to the region of interest of the target blood vessel in the image data based on the region of interest of the target blood vessel; obtaining the third image with the second target voxels by resampling the second image based on the second physical size corresponding to the second target voxels; obtaining the arterial trunk images and the venous trunk images by inputting the third image into the second segmentation model, which can be quickly prepared to separate the arterial trunks and venous trunks.

For example, if it is necessary to extract the artery and vein of the lungs, the acquired image data may be a chest image. A range of chest image generally may include a range between the clavicle and the bottom of the heart. The range of the chest image may be relatively large. If the original image data is directly input into the second segmentation model, because the input image data is large and occupies a large amount of video memory, the processing time may be long and a segmentation speed may be slow. In order to save the occupation of computer resources such as video memory, the arterial and venous trunks of the target blood vessels may be extracted in two stages. A coarse segmentation stage (that is, using the first segmentation model stage) may include sampling the original image data to a low resolution, reduce a number of input image voxels, obtaining a rough target blood vessel (the outline of the target blood vessel), and determining an image of the region of interest in raw image data according to the rough segmentation result. In a fine segmentation stage (that is, using the second segmentation model stage), the region of interest image may be resampled to a high resolution (that is, the third image) and then input to the second segmentation model. The input image may be clearer, and the segmentation result may be more accurate, and only the region of interest may be precisely segment, which may reduce the occupied computing resources such as large video memory, reduce a processing time, and improve a segmentation speed.

Using a two-layer neural network model (i.e., the first segmentation model and the second segmentation model), the arterial trunk and the venous trunk may be extracted more accurately. Using a convolutional neural network to complete the initial segmentation of the arteries and veins, and using augmented and non-enhanced arterial and venous data for further segmentation, the extraction and classification of the arterial and venous trunks and some thin branches may be completed quickly (for example, within 10 seconds). The convolutional neural network model may improve a segmentation effect of the trunk branches of the arterial and venous.

By resampling the image corresponding to the region of interest in the image data to form enhanced data (i.e., the third image), a gray value of the superior vena cava may be higher but there may be radial artifacts around it. Classifying arterial and venous trunks by a neural network model (i.e., a learning algorithm) may improve an integrity of the arterial trunk and ensure that the arterial trunk will not be mistakenly segmented into the superior vena cava. For the segmentation of the pulmonary blood vessels, due to fixed adhesions between the upper left branch of the pulmonary vein and the upper left branch of the pulmonary artery, and between the upper right branch of the pulmonary vein and the upper right middle branch of the pulmonary artery, the trunk branches of the pulmonary artery and the pulmonary vein may be segmented through the neural network model (that is, using a deep learning algorithm), such that the segmentation effect may be good, and main branch segmentation errors may be avoided or reduced.

Figure 7:
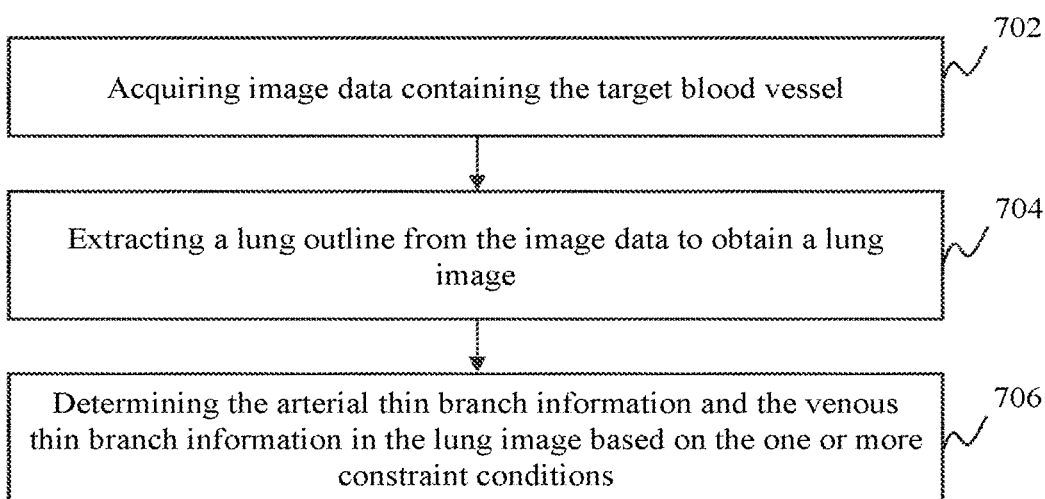
FIG. 7 is a flowchart of a process for determining arterial and venous thin branch information according to some embodiments of the present disclosure.

FIG. 7 is a flowchart of a process for determining arterial thin branch information and venous thin branch information according to some embodiments of the present disclosure. This embodiment may be applied to a situation where it is necessary to determine the artery and vein of the target blood vessel in the medical image. Process 700 may be performed by the processing device 120 (e.g., the processing device 120A) or by the computing device 200. For example, process 700 may be implemented as an instructions set (e.g., an application program) stored, e.g., in the storage device 130, the memory 228, in the memory external to and accessible by the image processing system. The processing device 120 or the computing device 200 may execute the instruction set and, when executing the instruction set, the processing device 120 or the computing device 210 may be configured to perform process 700. The operations of process 700 presented below may be intended to be illustrative. In some embodiments, the process may be accomplished using one or more additional operations not described and/or one or more operations not discussed. Additionally, a sequence of operations of process 700 is illustrated in FIG. 7 and descriptions below are not intended to be restrictive. Operation 506 in FIG. 5 may be performed in accordance with process 700.

In 702, the processing device 120A may acquire image data containing the target blood vessel. In some embodiments, operation 702 may be performed by the acquisition module 302. More descriptions regarding the image data of the target blood vessel may refer to operation 502 in FIG. 5.

In 704, the processing device 120A may extract lung outlines from the image data to obtain a lung image. In some embodiments, operation 704 may be performed by the second portion determination module 306. For the convenience of description, the description of the process shown in FIG. 7 takes pulmonary blood vessel determination as an example, and does not limit the scope of the present disclosure. For example, the process shown in FIG. 7 may also be used to extract other portions (e.g., spleen, stomach, brain, limbs, etc.) of blood vessels of the target object, and outlines of other portions may be extracted from the image data to obtain corresponding images. In some embodiments, the processing device 120A may extract a lung image based on an image segmentation technique described elsewhere in this disclosure. For the image segmentation technique, please refer to the detailed description in FIG. 4. As another example, the processing device 120A may determine the lung image based on a similar process of extracting an image corresponding to the region of interest in the image data in FIG. 6. In some embodiments, when process 600 shown in FIG. 6 is used to determine pulmonary arteriovenous blood vessel, the processing device 120A may designate an image (i.e., the second image) corresponding to the region of interest in the extracted image data in FIG. 6 as the lung image.

In 706, the processing device 120A may determine the arterial thin branch information and the venous thin branch information in the image data based on the one or more constraint conditions. In some embodiments, operation 706 may be performed by the second portion determination module 306.

In some embodiments, the processing device 120A may determine the arterial thin branch information and the venous thin branch information in the image data using a vessel segmentation technique based on the one or more constraint conditions. The vessel segmentation technique may include the boundary-based segmentation technique, the region-based segmentation technique, and segmentation techniques incorporating specific theories and tools. The boundary-based vessel segmentation technique may include a model-based algorithm or an edge detection-based algorithm. The region-based vessel segmentation technique may include a region growing algorithm or a cluster-based segmentation algorithm. The vessel segmentation technique incorporating a specific theory and tool may include the artificial intelligence-based algorithm, the neural network model-based algorithm, the genetic algorithm, and the like.

In some embodiments, the processing device 120A may utilize a vessel tracking algorithm to determine arterial branch information and venous branch information in the image data based on one or more constraint conditions. As described herein, the one or more constraint conditions used to determine the arterial branch information and the venous thin branch information in the image data using the vessel tracking algorithm may also be referred to as one or more tracking constraint conditions (or one or more first constraint conditions). In some embodiments, using the vessel tracking algorithm, the processing device 120A may determine an end point position and end point orientation of an arterial trunk or a venous trunk. The processing device 120A may track the arterial thin branches and venous thin branches of the lung data based on the one or more tracking constraint conditions, the end point position, and end point orientation of the arterial trunk or the venous trunk. Reference can be made to the detailed description elsewhere in this disclosure, for example, the detailed description in FIG. 6. In some embodiments, the end point orientation of the arterial trunk or the venous trunk refers to a direction of a tangent at the end point of the arterial trunk or the venous trunk.

In some embodiments, the vessel tracking algorithm may fit a local vessel using a cylindrical model to determine information such as the diameter, direction, and the like of the vessel. The one or more tracking constraint conditions may include: a) a maximum number of tracked blood vessel segments, a maximum number of tracked voxels, and a minimum blood vessel diameter; b) an included angle between two blood vessels that satisfies certain conditions during a blood vessel tracking process being greater than an angle threshold, when the included angle between two blood vessels is large (for example, greater than the threshold), it can be considered that the pulmonary artery and the pulmonary vein are adhered, and a current blood vessel tracking may be stopped. The two blood vessels that satisfy certain conditions may be two adjacent blood vessel branches, also may be two blood vessel branches separated by a certain distance, or may be acquired by dividing a plurality of continuous blood vessel branches into two; c) The diameters of the arterial blood vessel or the venous blood vessels decreasing smoothly from the trunk to the thin blood vessels, during a tracking process of the blood vessels, setting the diameters of the blood vessels to keep getting smaller. When a diameter difference between adjacent blood vessel segments suddenly increases and exceeds a preset threshold, the current blood vessel tracking being stopped; d) The gray value of the image near the adhesion point of pulmonary arteriovenous changing from high to low and then high. When the gray value of the image corresponding to the center of the blood vessel of continuous preset segments of branches of the blood vessels changes unevenly or has a large difference, the current blood vessel tracking being stopped; e) For the pulmonary artery, it is adjacent to the trachea in the lung and has approximately the same direction, and the pulmonary artery and the trachea are continuously separated, and the pulmonary finally reaches the alveolar wall. If there is a trachea with the same direction within a preset distance around the blood vessel segment, the blood vessel segment is considered to belong to the pulmonary artery; f) For the pulmonary artery and vein, a distance from the adhesion of the pulmonary arteriovenous thin branch to the hilum of the pulmonary artery and venous trunks is less than a distance threshold, for the blood vessel segment that can be traced from an end point of the pulmonary artery and an end point of the pulmonary vein, the closer the blood vessel segment is to the blood vessel segment at the hilum of the pulmonary artery or pulmonary vein, the greater a probability of the blood vessel segment belonging to the pulmonary artery or the pulmonary vein may be; g) The blood vessel has continuity, all blood vessel segments between a plurality of consecutive bifurcation points are both arteries or veins; h) The blood vessels are unique, and a blood vessel segment can only be an artery or a vein.

Since the end point is located on the surface of the identified arterial trunk or venous trunk or within the identified arterial trunk or venous trunk and close to the surface, before determining the location and direction of the end point of the arterial trunk or venous trunk, it is possible to optimize the determined outline and region information of the arterial trunk and the venous trunk to make an edge of the segmentation result more in line with an actual blood vessel edge, thereby more accurately determining a position of the end point of the arterial trunk or venous trunk.

In some embodiments, the processing device 120A may extract the thin blood vessels of the target blood vessel from the image data based on the blood vessel segmentation technique; determine the adhesion point between the arterial thin branch and the venous thin branch based on the one or more constraint conditions; and identify the arterial and venous thin branches in the thin blood vessels based on the adhesion point. As described herein, the one or more constraint conditions used to distinguish arterial and venous thin branches may also be referred to as one or more separation constraint conditions (or one or more second constraint conditions).

In some embodiments, the vessel segmentation technique for extracting the thin branch blood vessels may include a Hessian enhancement algorithm, a region growing algorithm, a threshold extraction algorithm, or the like. In some embodiments, the target blood vessels in the image data may be extracted, and then the thin branch blood vessels of the target blood vessels may be extracted from all the target blood vessels. In some embodiments, the thin blood vessels of the target blood vessel may be directly extracted from the image data.

In some embodiments, after the thin branch vessels of the target blood vessel are extracted, the arterial trunk and venous trunk acquired based on the neural network model may be used in combination with the one or more separation constraint conditions to determine or distinguish the arterial thin branch and venous thin branch in the thin branch vessels. The arterial trunk and venous trunk may help determine which vessels belong to arterial thin branches and which vessels belong to venous thin branches, while the one or more separation constraint conditions may help determine the adhesion point between arterial and venous thin branches to avoid misjudgment of the arterial and venous thin branches.

In some embodiments, the one or more separation constraint conditions (which may also be referred to as one or more second constraint conditions) may include one or more constraint conditions related to local features and one or more constraint conditions related to global features.

In some embodiments, the one or more separation constraint conditions based on local features may be such that: a) the directions of two adjacent blood vessels with the same label (both arteries or both veins) change greatly. If the directions of the two adjacent blood vessels change is smaller, the intersection of two adjacent blood vessels may be considered as the adhesion point of an artery and a vein, that is, the angle between the two adjacent blood vessels is smaller than the angle threshold and may be considered as the adhesion point of arterial blood vessel and the venous blood vessels; b) a diameter of the blood vessel with the same label decreases from the root to the end. If the diameter of the two adjacent blood vessels changes suddenly, the intersection of the two adjacent blood vessels is the adhesion point of the arterial blood vessel and the venous blood vessels; c) the gray values of the blood vessels with the same label change uniformly, that is, a fluctuation of the gray values is small. If the gray values of the two adjacent blood vessels change greatly, the intersection of the two adjacent blood vessels is the adhesion point of the arterial blood vessel and the venous blood vessel; d) for the pulmonary artery, the branches of the pulmonary artery and the bronchus are accompanied. If a vessel segment is adjacent to the bronchus, the vessel segment is the pulmonary artery.

The one or more separation constraint conditions based on the global features may be such that: a) vessels with the same label have continuity; b) the entire artery or vein is in a tree-like structure; c) arteries and veins are independent and unconnected. If there is a communication path from the pulmonary artery to the pulmonary vein, there must be at least one arteriovenous adhesion point on the current communication path, and two sides of the adhesion point are artery and vein, respectively.

In some embodiments, using the global features and the local features to determine the arteriovenous adhesion points may include constructing an energy term for adjacent blood vessel segments, each sub-term in the energy term may correspond to a local blood vessel feature of the constraint condition, and the energy term may be weighted sum of at least one sub-term. For all extracted unclassified blood vessels, a corresponding energy term network may be constructed, in which each node of the energy term network may correspond to a blood vessel segment, and adjacent nodes in the energy term network may be connected to two adjacent blood vessel segments, and energy connected by adjacent nodes in the energy term network may represent a possibility that the corresponding vessel segment and the adjacent vessel segment are a same type of vessel. According to global features of an arteriovenous separation, the energy term network may be disconnected into two portions. A disconnected position of the energy term network may be the adhesion position of the arterial blood vessel and the venous blood vessel. When the two disconnected portions correspond to the actual venous blood vessel and the actual arterial blood vessel, the energy network may be optimal.

Since the neural network model is not accurately capable of identifying thin blood vessels with a small diameter, it may be necessary to further complete a segmentation of thin branch blood vessels of the pulmonary artery and vein.

The segmentation of the thin branch blood vessels of the pulmonary artery and the pulmonary vein based on a tracking process including extracting the lung outline; 2) obtaining portions of the pulmonary arterial trunk and pulmonary venous trunk in the lung segmented in a previous step, and optimizing the outline of the portion; 3) determining terminal points and terminal directions of the pulmonary arterial trunk and pulmonary venous trunk in the lung, tracking unsegmented blood vessel thin branches after the terminal points using a blood vessel track algorithm. In the tracking process, one or more p tracking constraint conditions in the embodiments of the present disclosure may be used to avoid tracking from the pulmonary artery to the pulmonary vein or from the pulmonary vein to the pulmonary artery, and the extraction and segmentation of terminal thin branch blood vessels of the pulmonary artery and vein may be completed.

The separation of thin branches of the pulmonary artery and vein based on a regional classification technology may include 1) extracting the lung outline; 2) extracting all the pulmonary thin branch blood vessels in 3D data of an initial lung image by manners of Hessian enhancement, regional growth, or threshold extraction 3) determining unmarked thin branches of the pulmonary artery and the pulmonary vein by combined with the pulmonary arterial trunk and pulmonary venous trunk segmented in the previous step and the one or more separation constraint conditions in the embodiment of the present disclosure.

FIG. 8 is a flowchart of an exemplary process for generating a trained neural network model according to some embodiments of the present disclosure. Process 800 may be performed by the processing device 120 (e.g., the computing device 120B) or by the computing device 200. For example, process 800 may be implemented as a set of instructions (e.g., an application program) stored, e.g., in the storage device 130, the memory 228, the memory external to and accessible by the image processing system. The processing device 120 or the computing device 200 may execute the set of instructions and, when executing the instructions, the processing device 120 or the computing device 200 may be configured to perform process 800. The operations of process 800 presented below are intended to be illustrative. In some embodiments, this process may be accomplished using one or more additional operations not described and/or one or more operations not discussed. Additionally, a sequence of operations of process 800 are shown in FIG. 8 and descriptions below are not intended to be limiting.

In 802, the processing device 120B may acquire multiple pairs of training samples. Each sample pair in at least a portion of the multiple pairs of samples may include a sample image and a reference image corresponding to the sample image, and the reference image may include a marked target blood vessel. In some embodiments, operation 802 may be performed by the acquisition modulo 301. In some embodiments, the sample image may be used as an input of the model training process, and a reference image corresponding to the sample image can be used as a reference output (or expected output) in the model training process.

In some embodiments, the sample image may be image data including the target object. The target object may include the target blood vessel. In some embodiments, the target blood vessel may include the arterial blood vessel and venous blood vessel. For more description of the target object, the target blood vessel and image data of the target blood vessel, see detailed description in FIGS. 4-5.

In some embodiments, the reference image including a marked target blood vessel may mean that a position of the target blood vessel in the reference image has been determined and marked. For example, the target blood vessel may be marked by highlighting the outline of the target blood vessel in the reference image. In some embodiments, the arterial blood vessel and the venous blood vessel in the image data may be marked separately. For example, the outline of the arterial blood vessel and the outline of the venous blood vessel in the reference image may be highlighted with different colors. In some embodiments, the arterial blood vessel and the venous blood vessel in the image data may not be marked separately, and only the target blood vessel in the image data may be marked. For example, the outline of the arterial blood vessel and the outline of the venous blood vessel in the reference image may be highlighted with the same color.

In some embodiments, the reference image including a labeled target blood vessel may refer to assigning a label to the target blood vessel in the sample image. The label may indicate a blood vessel where the voxels (or pixels) in a region where the target blood vessel is located in in the sample image belongs. For example, the voxels (or pixels) in a region where the arterial blood vessel and the venous blood vessel are located in in the sample image may be assigned labels to indicate that the voxels (or pixels) in the region belong to the "target blood vessel." As another example, labels may be assigned to voxels (or pixels) in the region where the arterial blood vessel is located in in the sample image to indicate that the voxels (or pixels) in the region belong to "arterial blood vessel"; labels may be assigned to voxels (or pixels) in the region where the venous blood vessel is located in in the sample image to indicate that the voxels (or pixels) in the region belong to "venous blood vessel."

In some embodiments, the reference image may be labeled to mark the first portion of the plurality of branches of the target blood vessel in the sample image and be assigned with a label to indicate that the voxels (or pixels) of the region belong to the "first portion of the plurality of branches of the target blood vessel."

In some embodiments, the reference image may simultaneously be labeled to mark the first and second portion of the plurality of branches of the target blood vessel in the sample image and be assigned with labels to indicate that the voxels (or pixels) in the region belong to the "target blood vessel."

In some embodiments, since the pulmonary veins include left superior pulmonary vein, right superior pulmonary vein, left inferior pulmonary vein and right inferior pulmonary vein, and the left superior pulmonary vein, right superior pulmonary vein, left inferior pulmonary vein and right inferior pulmonary vein are connected to the left atrium respectively. Therefore, in order to ensure that the pulmonary veins are a connected whole, the left atrium and the pulmonary veins in the sample image may be set to a same label, and the left atrium may be segmented at a same time when segmenting the pulmonary blood vessel trunk.

In some embodiments, the region of interest including the target blood vessel may be marked. The neural network model trained based on reference images labeled with the region of interest may output predicted output labeled with the region of interest.

In some embodiments, preprocessing operations may be performed on sample images and/or reference images. For more descriptions of the preprocessing operations, see detailed descriptions elsewhere in this disclosure (e.g., FIG. 4 and its related descriptions).

In 804, the processing device 120B may train an initial neural network model through an iterative process. In a current iteration of the iterative process, the model parameter values of the initial neural network model may be updated until the iterative process terminates. In some embodiments, operation 804 may be performed by the model generation module 303. In some embodiments, the initial neural network model may include a convolutional neural network model. The convolutional neural network model may include a convolutional neural network model described elsewhere in this disclosure, e.g., the deep convolutional neural network model, the fully convolutional neural network model, or the like. In some embodiments, a structure of the initial neural network model may be described in 9A and 9B. In some embodiments, the initial neural network model may include a first portion and a second portion. A first portion of the initial neural network model may form the first segmentation model after training, and a second portion of the initial neural network model may form the second segmentation model after training. An output of the first portion of the initial neural network model may be used as an input of the second portion of the initial neural network model. In some embodiments, a model generated by the initial neural network model after a training of a first number of iterations may be the first segmentation model, and a model generated by the initial neural network model after a training of a second number of iterations may be the second segmentation model. In some embodiments, the first number may be smaller than the second number.

In some embodiments, one or more model parameters of the initial neural network model may have initial values prior to model training. When training the initial neural network model, values of the model parameters of the initial neural network model may be updated so that a loss function of the initial neural network model may be minimized. In some embodiments, the loss function of the initial neural network model may include a consistency term. The consistency term may be used to constrain a difference between a predicted output of the initial neural network model and an expected output of the initial neural network model (i.e., the reference image). For example, the consistency term may be used to constrain a difference between a target blood vessel predicted by the initial neural network model and a target blood vessel marked in the reference image. In some embodiments, the loss function of the initial neural network model may further include a regular term, and the regular term may be constructed based on the one or more constraint conditions, and may be used to constrain the local features and/or global features of the target blood vessel and the reference local features and/or the reference global features corresponding to the one or more constraint conditions. In some embodiments, the local features (which may also be referred to as predicted local features) and/or the global features (which may also be referred to as predicted global features) of the target blood vessel predicted during the training process may be represented as prediction vectors, each of which may be referred to as a prediction vector. Each element of the prediction vector may represent a feature. The reference local features and/or the reference global features corresponding to the one or more constraint conditions may be represented as reference vectors. The regular term may constrain a difference (i.e., distance) between the predicted vector and the reference vector. For example, the regular term may include a L0 norm, a L1 norm, a L2 norm, and the like.

A current iteration of one or more iterations is described in the description below. In the current iteration, the processing device 120B may input sample image data (which may also be referred to as input images) in each pair of the training samples into the initial neural network model in the current iteration, to obtain an output of the initial neural network model (i.e., a predicted output). The processing device 120B may determine a value of the loss function based on the reference image (i.e., the expected output or the reference output) and the predicted output in each pair of the training samples. The loss function may be used to measure the difference between an actual output and a predicted output in each pair of the training samples. The processing device 120B may determine whether a termination condition is satisfied in the current iteration. An exemplary termination condition may be that a value of the loss function acquired in the current iteration is smaller than a preset threshold. Other exemplary termination conditions may include that a certain number of iterations have been performed, the loss function has converged (e.g., a difference of the loss function acquired in two consecutive iterations is within a threshold), and the like. If the termination condition is satisfied in the current iteration, the processing device 120B may designate the initial neural network model in the current iteration as the trained neural network model. The processing device 120B may further store the trained neural network model into a storage device of the imaging system 100 (e.g., the storage device 130 and/or memory 228), and/or output the model for further use (e.g., in the process 400, 500 and/or process 600).

If the termination condition in the current iteration is not satisfied, the processing device 120B may update the initial neural network model in the current iteration and proceed to a next iteration. For example, the processing device 120B may update the values of the model parameters of the initial neural network model based on the value of the loss function according to an algorithm such as backpropagation. The processing device 120B may designate the initial neural network model after updating the parameter values as the initial neural network model in the next iteration. The processing device 120B may perform the next iteration until the termination condition is satisfied. When the termination condition is satisfied in an iteration, the initial neural network model in this iteration may be designated as the trained neural network model (e.g., the first segmentation model and/or the second segmentation model described in FIG. 5 and FIG. 6).

It is important to note that the output of the trained neural network model may be relative to the reference image in the multiple pairs of training samples. If the reference image is an image that includes the first portion of the plurality of branches of the target blood vessel (e.g., the first portion of the branches of the arterial blood vessel and the venous blood vessel), a trained neural network model may be configured to predict the first portion of the plurality of branches of the target blood vessel (e.g., the first segmentation model or the second segmentation model). If the reference image is an image that includes the first portion of the plurality of branches of the target blood vessel (e.g., the first portion of branches of the arterial blood vessel and the first portion of branches of the venous blood vessel), the first portion of branches of the arterial blood vessel and the first portion of branches of the venous blood vessel may be marked, respectively. Then the trained neural network model may be used for prediction and separation of the first portion of branches of the arterial blood vessel and the first portion of branches of the venous blood vessel (e.g., the first segmentation model or the second segmentation model). If the reference image is an image of the region of interest including the target blood vessel, the trained neural network model may be configured to predict the region of interest. If the reference image is an image that includes the target blood vessel (e.g., the first portion of branches of the arterial blood vessel and the venous blood vessel), the trained neural network model may be configured to predict the target blood vessel (e.g., the first segmentation model or the second segmentation model). If the reference image is an image that includes the target blood vessel (e.g., the arterial blood vessel and venous blood vessel) and is labeled with the arterial blood vessel and venous blood vessel, respectively, the trained neural network model may be configured for the prediction and separation of the arterial blood vessel and venous blood vessel.

It should be noted that the above description of process 800 is provided for illustration purposes only, and is not intended to limit the scope of the present disclosure. For those of ordinary skill in the art, various changes and modifications may be made based on the description of the present disclosure. However, these changes and modifications do not depart from the scope of this disclosure. In some embodiments, process 800 may include one or more additional operations, or one or more operations described above may be omitted. For example, process 800 may include preprocessing a sample image. As another example, process 800 may include extracting image features of a sample image and image features of a reference image to determine a value of the loss function.

Figure 9A:
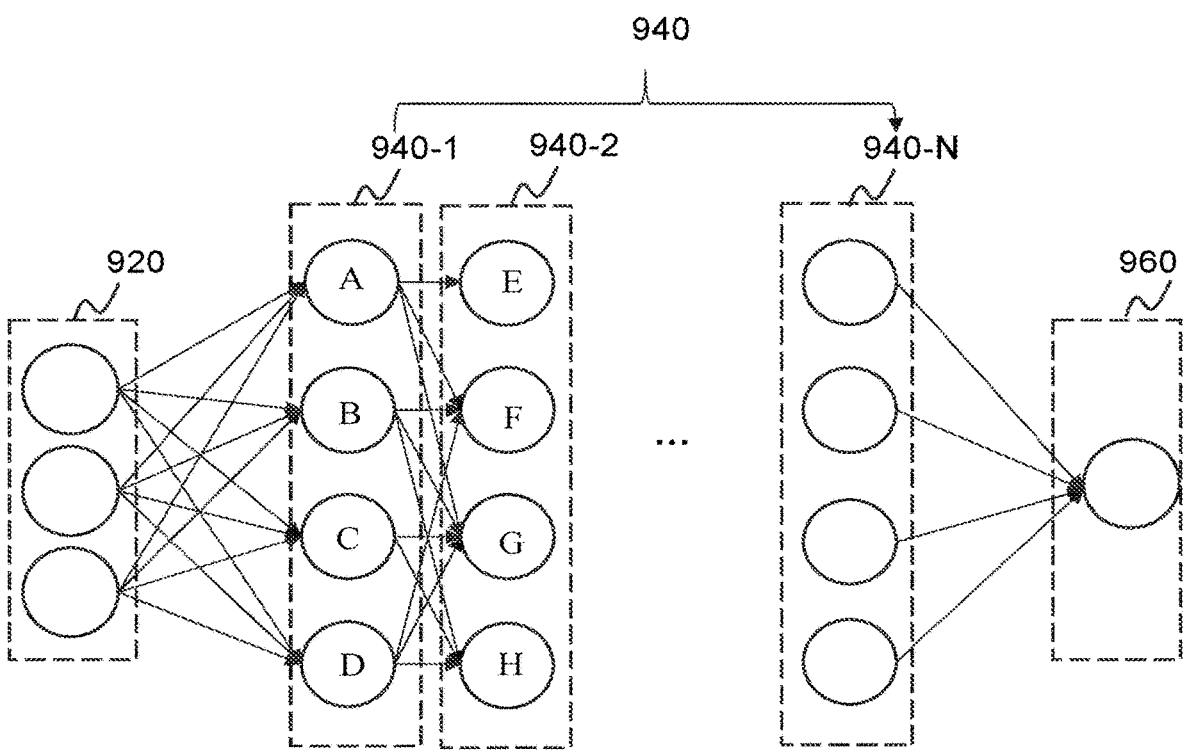
FIG. 9A is a schematic diagram of an exemplary convolutional neural network (CNN) model according to some embodiments of the present disclosure.

FIG. 9A is a schematic diagram of an exemplary convolutional neural network (CNN) model according to some embodiments of the present disclosure.

The convolutional neural network model may include an input layer 920, a plurality of hidden layers 940, and an output layer 960. The plurality of hidden layers 940 may include one or more convolutional layers, one or more Rectified Linear Unit (ReLU layers), one or more pooling layers, one or more fully connected layers, etc., or any combination thereof.

For illustrative purposes, exemplary hidden layers 940 of the convolutional neural network model shown may include a convolutional layer 940-1, a pooling layer 940-2, and a fully connected layer 940-N. Image data may be used as input to the convolutional neural network model. The image data may be represented as a two-dimensional (2D) or three-dimensional (3D) matrix including at least two elements (e.g., pixels or voxels). Each of the at least two elements in the matrix may have a value (also referred to as a pixel/voxel value) that characterizes the element.

The convolutional layer 940-1 may include at least two convolution kernels (e.g., A, B, C, and D). The at least two convolution kernels may be used to extract features from the image data. In some embodiments, each of the at least two convolution kernels may filter a portion (e.g., a region) of the image data to produce specific features corresponding to the portion of the image data. The features may include low-level features (e.g., edge features, texture features), high-level features, or complex features computed based on the convolution kernels.

The pooling layer 940-2 may take an output of the convolutional layer 940-1 as an input. The pooling layer 940-2 may include at least two pooling nodes (e.g., E, F, G, and H). The at least two pooling nodes may be used to sample the outputs of the convolutional layer 940-1, thus reducing a computational load of data processing and improving a data processing speed of the image processing system 100.

The fully connected layer 940-N may include at least two neurons (e.g., O, P, M, and N). The at least two neurons may be connected to at least two nodes of a previous layer, e.g., a pooling layer. In the fully connected layer 940-N, at least two vectors may be determined based on features of the image data, the at least two vectors may correspond to the at least two neurons, and further the at least two vectors may be weighted with at least two weighting coefficients.

In the output layer 960, an output (e.g., arterial trunk images and venous trunk images) may be determined based on the at least two vectors and weighting coefficients acquired in a fully connected layer 1240-N.

It should be noted that the convolutional neural network model may be modified when applied under different conditions. For example, during training, a layer of the loss function (also called cost function) may be added to specify a deviation between the predicted output (e.g., the predicted image) and a ground-truth label (e.g., the reference image).

In some embodiments, a plurality of processing units (e.g., GPUs) may perform parallel processing in some layers of the convolutional neural network model. The parallel processing may be performed in such a way that the computation of different nodes in a layer of the convolutional neural network model may be distributed to two or more processing units. For example, one GPU may perform computations corresponding to the convolution kernels A and B, and other GPUs may perform computations corresponding to the convolution kernels C and D in the convolutional layer 1240-1. Similarly, computations corresponding to different nodes in other types of layers in the convolutional neural network model may be performed in parallel by a plurality of GPUs.

Figure 9B:
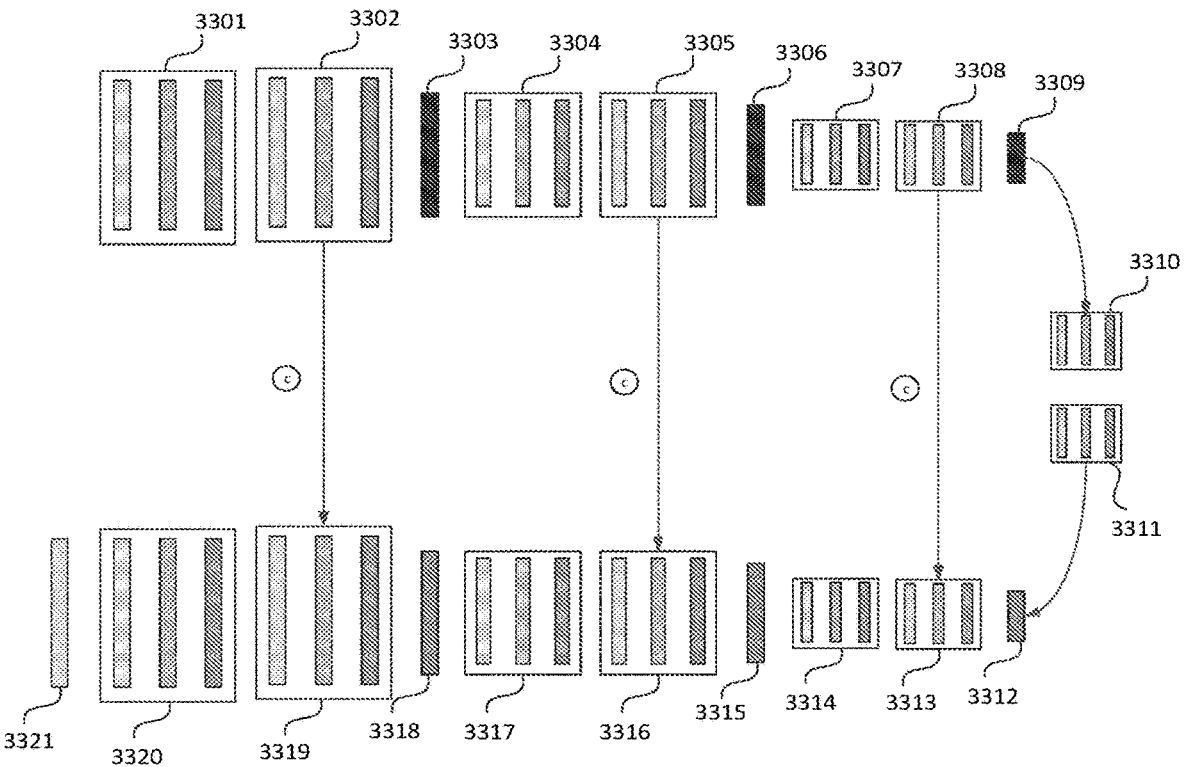
FIG. 9B is a schematic structural diagram of a convolutional neural network model according to some embodiments of the present disclosure.

FIG. 9B is a schematic structural diagram of a convolutional neural network model according to some embodiments of the present disclosure. As shown in FIG. 9B, a network structure of the convolutional neural network model from left to right may be:

The first layer 3301 may include a convolutional layer Conv, a batch normalization layer, and a ReLU function activation layer. In some embodiments, a convolution kernel size k of the convolutional layer Conv may be 3×3×3, an input channel size may be 1, an output channel size f may be 8, a moving step size s may be 1, and a padding size p may be 1.

The second layer 3302 may be the convolutional layer Conv, the batch normalization layer and the ReLU function activation layer. In some embodiments, the convolution kernel size k of the convolutional layer Conv may be 3×3×3, the input channel size may be 8, the output channel size f may be 16, the moving step size s may be 1, and the padding size p may be 1.

The third layer 3303 may include a maximum pooling layer MP, whose pooling interval k may be 2×2×2, and the moving step s may be 2.

The fourth layer 3304 may include the convolutional layer Conv, the batch normalization layer, and the ReLU function activation layer. In some embodiments, the kernel size k of the convolutional layer Conv may be 3×3×3, the input channel size may be 16, the output channel size f may be 16, the moving step size s may be 1, and the padding size p may be 1.

The fifth layer 3305 may include the convolutional layer Conv, the batch normalization layer and the ReLU function activation layer. In some embodiments, the kernel size k of the convolutional layer Conv may be 3×3×3, the input channel size may be 16, the output channel size f may be 32, the moving step size s may be 1, and the padding size p may be 1.

The sixth layer 3306 may include a max pooling layer MP with a pooling interval k of 2×2×2 and a moving step size s of 2.

The seventh layer 3307 may include the convolutional layer Conv, the batch normalization layer, and the ReLU function activation layer. In some embodiments, the kernel size k of the convolutional layer Conv may be 3×3×3, the input channel size may be 32, the output channel size f may be 32, the moving step size s may be 1, and the padding size p may be 1.

The eighth layer 3308 may include the convolutional layer Conv, the batch normalization layer, and the ReLU function activation layer. In some embodiments, the convolution kernel size k of the convolutional layer Conv may be 3×3×3, the input channel size may be 32, the output channel size f may be 64, the moving step size s may be 1, and the padding size p may be 1.

The ninth layer 3309 may include the max pooling layer MP with a pooling interval k of 2×2×2 and a moving step s of 2.

The tenth layer 3310 may include the convolutional layer Conv, the batch normalization layer, and the ReLU function activation layer. In some embodiments, the kernel size k of the convolutional layer Conv may be 3×3×3, the input channel size may be 64, the output channel size f may be 64, the moving step size s may be 1, and the padding size p may be 1.

The eleventh layer 3311 may include the convolutional layer Conv, the batch normalization layer, and the ReLU function activation layer. In some embodiments, the convolution kernel size k of the convolutional layer Conv may be 3×3×3, the input channel size may be 64, the output channel size f may be 128, the moving step size s may be 1, and the padding size p may be 1.

The twelfth layer 3312 may include a transposed convolutional layer TConv with a kernel size k of 2×2×2 and a moving stride s of 2.

The thirteenth layer 3313 and the fourteenth layer 3314 may be the same. Each layer of the thirteenth layer 3313 and the fourteenth layer 3314 may include the convolution layer Conv, the batch normalization layer and the ReLU function activation layer. The convolution kernel size k of the convolution layer Conv may be 3×3×3, and the input channel size may be 64, the output channel size f may be 64, the moving step s may be 1, and the padding size p may be 1.

The fifteenth layer 3315 may include a transposed convolutional layer TConv with a kernel size k of 2×2×2 and a moving stride s of 2.

The sixteenth layer 3316 and the seventeenth layer 3317 may include a convolutional layer Conv, a batch normalization layer, and a ReLU function activation layer. The convolution kernel size k of the convolutional layer Conv may be 3×3×3, the input channel size may be 32, the output channel size f may be 32, the moving step size s may be 1, and the padding size p may be 1.

The eighteenth layer 3318 may include the transposed convolutional layer TConv with a kernel size k of 2×2×2 and a shift stride s of 2.

The nineteenth layer 3319 and the twentieth layer 3320 may include the convolutional layer Conv, the batch normalization layer, and the ReLU function activation layer. In some embodiments, the kernel size k of the convolutional layer Conv may be 3×3×3, the input channel size may be 16, the output channel size f may be 16, the moving step size s may be 1, and the padding size p may be 1.

The twenty-first layer 3321 may include the convolutional layer Conv with a convolution kernel size k of 3×3×3 and an input channel size of 16. The output channel size f may be the type of segmented anatomy. For example, if the image data is divided into an arterial trunk, a venous trunk and a background region, the output channel size f may be 3; if the image data is divided into the target blood vessel trunk and background region, the output channel size f may be 2.

The above-mentioned neural network model may simultaneously adapt to enhanced blood vessel data, non-enhanced blood vessel data, arterial phase data, and venous phase data, etc., and may complete the extraction and classification of the arterial and venous trunks and some thin branches within seconds. Moreover, the segmentation effect of the arterial and venous trunks may be well ensured. For the enhanced data, the gray value of the superior vena cava may be high, and there may be radial artifacts around it. Results of the deep learning algorithm may not only ensure an integrity of the arterial trunk, but also ensure that the arterial trunk does not leak to the superior vena cava. The upper left branch of the pulmonary vein and the upper left branch of the pulmonary artery, the upper right branch of the pulmonary vein and the upper right middle branch of the pulmonary artery may be fixed and adhered. The deep learning method may have a good segmentation effect on the main blood vessel trunk, and may avoid the intractable segmentation errors of the main branches that exist in the existing methods.

FIG. 10 is a schematic diagram of segmentation of a pulmonary venous trunk according to some embodiments of the present disclosure. Images a and b are segmented lung images using the first segmentation model, and images c and d are segmented images of the regions of interest using the second segmentation model. After the lung image is acquired, the lung image (which can be three-dimensional image data) may be resampled into a first resampled lung image (i.e., the image a) with a larger spatial resolution. Image a is input into the first segmentation model, and then image a is segmented to obtain an overview image of the pulmonary blood vessels (i.e., the image b) by the first segmentation model. A largest connected region in the overview image of the pulmonary blood vessels is determined, and the largest connected region is designated as the region of interest of the pulmonary blood vessels (i.e., a region M in image b). The lung image including the region of interest of the pulmonary blood vessels is determined. The three-dimensional data of the lung image is resampled to obtain a second resampled lung image (i.e., the image c) with a smaller spatial resolution, the image c is inputted into the second segmentation model, and then the pulmonary arterial trunk and the pulmonary venous trunk (i.e., the image d) are segmented from the second resampled lung image using the second segmentation model. The above-mentioned first segmentation model and second segmentation network model may use a same neural network model, for example, may be a U-Net neural network model or different neural network models.

Figure 11:
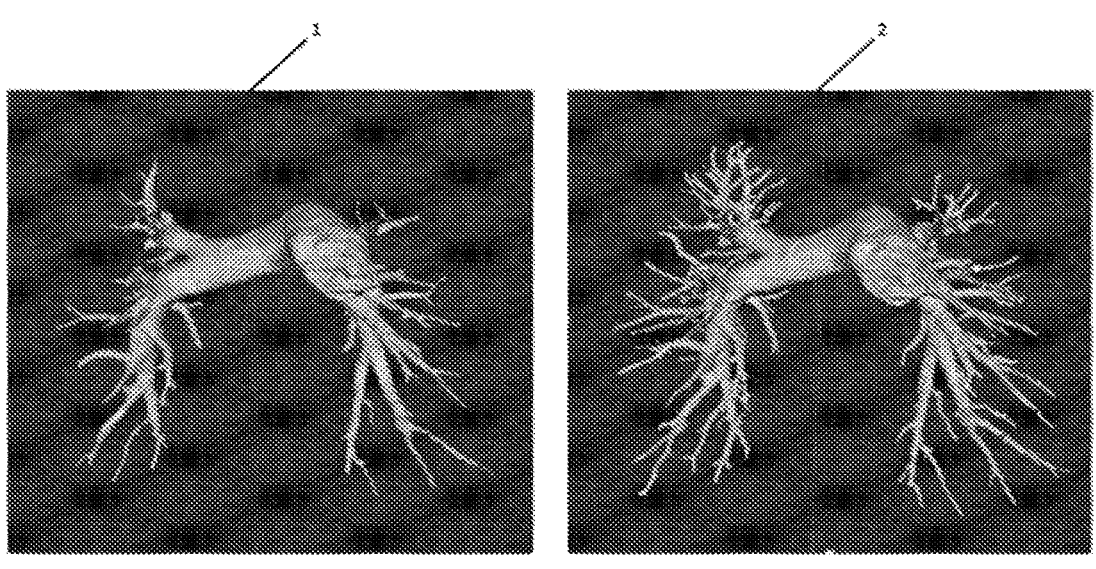
FIG. 11 is a schematic diagram of a main pulmonary artery and a complete pulmonary artery according to some embodiments of the present disclosure.
Figure 12:
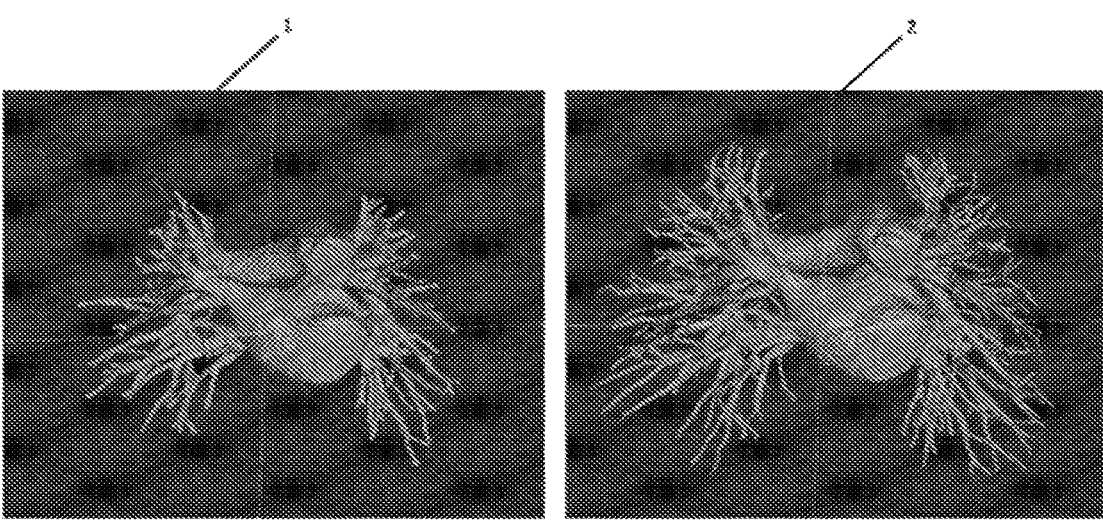
FIG. 12 is a schematic diagram of a main pulmonary artery and vein and a complete pulmonary artery and vein according to some embodiments of the present disclosure.

FIG. 11 is a schematic diagram of a pulmonary arterial trunk and a complete pulmonary artery according to some embodiments of the present disclosure. As shown in FIG. 11, image 1 represents the pulmonary arterial trunk, and image 2 represents a complete pulmonary artery including the pulmonary arterial trunk and the pulmonary arterial thin branches. FIG. 12 is a schematic diagram of a pulmonary arterial trunk, a pulmonary venous trunk and a complete pulmonary artery and vein according to some embodiments of the present disclosure. As shown in FIG. 12, image 1 represents the pulmonary arterial trunk and the pulmonary venous trunk, and image 2 represents the complete pulmonary artery and vein including the pulmonary arterial trunk, the pulmonary venous trunk, the pulmonary arterial thin branches, and pulmonary venous thin branches.

The basic concepts have been described above. Obviously, for those skilled in the art, the above detailed disclosure is only an example and does not constitute a limitation of the present disclosure. Although it is not explicitly stated here, those skilled in the art may make various modifications, improvements, and amendments to the present disclosure. Such modifications, improvements and amendments are suggested in the present disclosure, so such modifications, improvements and amendments still belong to the spirit and scope of the exemplary embodiments of the present disclosure.

Meanwhile, the present disclosure uses specific words to describe the embodiments of the present disclosure. For example, "one embodiment", and/or "some embodiments" mean a certain feature or structure related to at least one embodiment of the present disclosure. Therefore, it should be emphasized and noted that "one embodiment" or "an alternative embodiment" mentioned twice or more in different positions in the present disclosure does not necessarily refer to the same embodiment. In addition, certain features or structures in one or more embodiments of the present disclosure may be appropriately combined.

In addition, unless explicitly stated in the claims, the sequence of processing elements and sequences, the use of numbers and letters, or the use of other names described in the present disclosure are not used to define the sequence of processes and methods in the present disclosure. Although the above disclosure has discussed some currently considered useful embodiments of the invention through various examples, it should be understood that such details are only for the purpose of explanation, and the additional claims are not limited to the disclosed embodiments. On the contrary, the claims are intended to cover all amendments and equivalent combinations that conform to the essence and scope of the embodiments of the present disclosure. For example, although the system components described above can be implemented by hardware devices, they can also be implemented only by software solutions, such as installing the described system on an existing server or mobile device.

Similarly, it should be noted that, in order to simplify the description disclosed in the present disclosure and thus help the understanding of one or more embodiments of the invention, the foregoing description of the embodiments of the present disclosure sometimes incorporates a variety of features into one embodiment, the drawings or the description thereof. However, this disclosure method does not mean that the object of the present disclosure requires more features than those mentioned in the claims. In fact, the features of the embodiments are less than all the features of the single embodiments disclosed above.

In some embodiments, numbers describing the count of components and attributes are used. It should be understood that such numbers used in the description of embodiments are modified by the modifier "about", "approximate" or "generally" in some examples. Unless otherwise stated, "approximately" or "generally" indicate that a ±20% change in the figure is allowed. Accordingly, in some embodiments, the numerical parameters used in the description and claims are approximate values, and the approximate values can be changed according to the characteristics required by individual embodiments. In some embodiments, the numerical parameter should consider the specified significant digits and adopt the method of general digit reservation. Although the numerical fields and parameters used to confirm the range breadth in some embodiments of the present disclosure are approximate values, in specific embodiments, the setting of such values is as accurate as possible within the feasible range.

For each patent, patent application, patent application disclosure and other materials cited in the present disclosure, such as articles, books, specifications, publications, documents, etc., the entire contents are hereby incorporated into the present disclosure for reference. Except for the application history documents that are inconsistent with or conflict with the contents of the present disclosure, and the documents that limit the widest range of claims in the present disclosure (currently or later appended to the present disclosure). It should be noted that in case of any inconsistency or conflict between the description, definitions, and/or use of terms in the supplementary materials of the present disclosure and the contents described in the present disclosure, the description, definitions, and/or use of terms in the present disclosure shall prevail.

Finally, it should be understood that the embodiments described in the present disclosure are only used to illustrate the principles of the embodiments of the present disclosure. Other deformations may also fall within the scope of the present disclosure. Therefore, as an example rather than a limitation, the alternative configuration of the embodiments of the present disclosure can be regarded as consistent with the teachings of the present disclosure. Accordingly, the embodiments of the present disclosure are not limited to those explicitly introduced and described in the present disclosure.

What is claimed is:

1. A method for determining blood vessel information in an image, comprising:

acquiring image data including a target blood vessel, the target blood vessel including a plurality of branches;

determining a first portion of the plurality of branches of the target blood vessel from the image data based on one or more trained neural network models, wherein the one or more trained neural network models include a first segmentation model and a second segmentation model, and the determining the first portion of the plurality of branches of the target blood vessel from the image data based on the one or more trained neural network models includes:

obtaining a first image by performing a first operation on the image data, a spatial resolution of the first image being greater than a spatial resolution of the image data;

determining an overview of the target blood vessel in the first image by segmenting the first image based on the first segmentation model;

determining a region of interest based on the overview of the target blood vessel, the region of interest including the target blood vessel;

obtaining a second image by extracting the region of interest from the image data;

obtaining a third image by performing a second operation on the second image, a spatial resolution of the third image being greater than the spatial resolution of the image data; and determining the first portion of the plurality of branches in the third image based on the second segmentation model;

determining a second portion of the plurality of branches of the target blood vessel from the image data based on one or more constraint conditions, wherein the second portion of the plurality of branches is one or more branch structures of at least one of the first portion of the branches; and determining the target blood vessel based on the first portion of the plurality of branches and the second portion of the plurality of branches, the target blood vessel including at least one of an arterial blood vessel or a venous blood vessel.

2. The method of claim 1, wherein at least one of local features or global features of the target blood vessel determined based on the second portion of the plurality of branches and the first portion of the plurality of branches satisfy the one or more constraint conditions.

3. The method of claim 2, wherein the one or more constraint conditions include a constraint condition related to the local features of the target blood vessel, and the constraint condition related to the one or more local features of the target blood vessel includes at least one of:

an included angle between two adjacent branches of the target blood vessel being smaller than an included angle threshold or a diameter of a branch of the target blood vessel gradually decreasing from an upstream branch to a downstream branch.

4. The method of claim 2, wherein the one or more constraint conditions include a constraint condition related to the global features of the target blood vessel, and the constraint condition related to the one or more global features of the target blood vessel includes that the target blood vessel is a tree-like structure, the arterial blood vessel or the venous blood vessel is continuous, the arterial blood vessel is not connected with the venous blood vessel, and any branch of the plurality of branches belongs to only one of the arterial blood vessel or the venous blood vessel.

5. The method of claim 1, wherein the determining the first portion of the plurality of branches from the image data based on the one or more trained neural network models comprises:

separating a first portion of branches of the arterial vessel and a first portion of branches of the venous vessel from the image data based on the one or more trained neural network models; and the determining the second portion of the plurality of branches from the image data based on one or more constraint conditions includes:

separating a second portion of branches of the arterial blood vessel and a second portion of branches of the venous blood vessel from the image data based on the one or more constraint conditions.

6. The method of claim 5, wherein the determining the target blood vessel based on the first portion of the branches and the second portion of the branches comprises:

determining the arterial blood vessel based on the first portion of branches of the arterial blood vessel and the second portion of branches of the arterial blood vessel; and determining the venous blood vessel based on the first portion of branches of the venous blood vessel and the second portion of branches of the venous blood vessel.

7. The method of claim 5, wherein the separating the second portion of branches of the arterial blood vessel and the second portion of branches of the venous blood vessel from the image data based on the one or more constraint conditions comprises:

extracting the second portion of the plurality of branches from the image data;

determining intersection points between the second portion of the plurality of branches based on the one or more constraint conditions; and determining the second portion of branches of the arterial blood vessel and the second portion of branches of the venous blood vessel by classifying the second portion of the plurality of branches based on the intersection points.

8. The method of claim 7, wherein the determining intersection points between the second portion of the plurality of branches based on the one or more constraint conditions comprises:

constructing an energy term network based on the extracted second portion of the plurality of branches and the one or more constraint conditions, adjacent nodes in the energy term network corresponding to two adjacent branches, a connection between the two adjacent nodes being expressed through an energy term, the energy term including a difference between a local feature of the two adjacent branches and a constraint condition related to the local feature; and determining an optimal solution of the energy term network based on global features of the arterial blood vessel and the venous blood vessel, wherein the optimal solution of the energy term network is that when the energy term network is disconnected along one or more target nodes, two disconnected portions of the energy term network correspond to an actual venous blood vessel and an actual arterial blood vessel, respectively, and the one or more target nodes are intersection points of the arterial blood vessel and the venous blood vessel.

9. The method of claim 1, wherein the determining the second portion of the plurality of branches from the image data based on one or more constraint conditions comprises:

determining end position information of the first portion of the plurality of branches in the image data; and determining the second portion of the plurality of branches based on the one or more constraint conditions and the end position information of the first portion of the plurality of branches by using a tracking algorithm, wherein the one or more constraint conditions are used in a process of tracking the second portion of the plurality of branches to constrain the second portion of the plurality of branches to allow the one or more constraint conditions to be satisfied.

10. A system for determining blood vessel information in an image, comprising:

at least one storage device, configured to store an instruction set;

at least one processing device, in communication with the at least one storage device, and when the instruction set is executed by the processing device, causing the system to perform following operations, including:

acquiring image data including a target blood vessel, the target blood vessel including a plurality of branches;

determining a first portion of the plurality of branches of the target blood vessel from the image data based on one or more trained neural network models, wherein the one or more trained neural network models include a first segmentation model and a second segmentation model, and the determining the first portion of the plurality of branches of the target blood vessel from the image data based on the one or more trained neural network models includes:

obtaining a first image by performing a first operation on the image data, a spatial resolution of the first image being greater than a spatial resolution of the image data;

determining an overview of the target blood vessel in the first image by segmenting the first image based on the first segmentation model;

determining a region of interest based on the overview of the target blood vessel, the region of interest including the target blood vessel;

obtaining a second image by extracting the region of interest from the image data;

obtaining a third image by performing a second operation on the second image, a spatial resolution of the third image being greater than the spatial resolution of the image data; and determining the first portion of the plurality of branches in the third image based on the second segmentation model;

determining a second portion of the plurality of branches of the target blood vessel from the image data based on one or more constraint conditions, wherein the second portion of the plurality of branches is one or more branch structures of at least one of the first portion of the plurality of branches; and determining the target blood vessel based on the first portion of the plurality of branches and the second portion of the plurality of branches, the target blood vessel including at least one of an arterial blood vessel or a venous blood vessel.

11. The system according to claim 10, wherein at least one of local features or global features of the target blood vessel determined based on the second portion of the plurality of branches and the first portion of the plurality of branches satisfy the one or more constraint conditions.

12. The system according to claim 11, wherein the one or more constraint conditions include a constraint condition related to the local features of the target blood vessel, and the constraint condition related to the local features of the target blood vessel includes at least one of:

an included angle between two adjacent branches of the target blood vessel being smaller than an included angle threshold or a diameter of a branch of the target blood vessel gradually decreasing from an upstream branch to a downstream branch.

13. The system according to claim 11, wherein the one or more constraint conditions include a constraint condition related to the global features of the target blood vessel, and the constraint condition related to the global features of the target blood vessel includes that the target blood vessel is a tree-like structure, the arterial blood vessel or the venous blood vessel is continuous, the arterial blood vessel is not connected with the venous blood vessel, and any branch of the plurality of branches belongs to only one of the arterial blood vessel or the venous blood vessel.

14. The system of claim 10, wherein the determining the first portion of the plurality of branches from the image data based on the one or more trained neural network models comprises:

separating a first portion of branches of the arterial vessel and a first portion of branches of the venous vessel from the image data based on the one or more trained neural network models; and the determining the second portion of the plurality of branches from the image data based on one or more constraint conditions includes:

separating a second portion of branches of the arterial blood vessel and a second portion of branches of the venous blood vessel from the image data based on the one or more constraint conditions.

15. The system of claim 14, wherein the determining the target blood vessel based on the first portion of the branches and the second portion of the branches comprises:

determining the arterial blood vessel based on the first portion of branches of the arterial blood vessel and the second portion of branches of the arterial blood vessel; and determining the venous blood vessel based on the first portion of branches of the venous blood vessel and the second portion of branches of the venous blood vessel.

16. The system of claim 14, wherein the separating the second portion of branches of the arterial blood vessel and the second portion of branches of the venous blood vessel from the image data based on the one or more constraint conditions comprises:

extracting the second portion of the plurality of branches from the image data;

determining intersection points between the second portion of the plurality of branches based on the one or more constraint conditions; and determining the second portion of branches of the arterial blood vessel and the second portion of branches of the venous blood vessel by classifying the second portion of the plurality of branches based on the intersection points.

17. A non-transitory computer-readable storage medium, comprising at least one set of instructions, wherein when the instructions are executed by at least one processor, the at least one set of instructions instruct the at least one processor to perform a method of determining blood vessel information in an image, the method comprises:

acquiring image data including a target blood vessel, the target blood vessel including a plurality of branches;

determining a first portion of the plurality of branches of the target blood vessel from the image data based on one or more trained neural network models, wherein the one or more trained neural network models include a first segmentation model and a second segmentation model;

the first segmentation model and the second segmentation model are acquired through a training process, and the training process includes:

obtaining multiple pairs of samples, each pair in at least a portion of the multiple pairs of samples includes a sample image and a reference image corresponding to the sample image, and the reference image includes a marked target blood vessel; and training an initial neural network model through an iterative process; and the initial neural network model includes a first portion and a second portion, an output of the first portion is used as an input of the second portion, the first segmentation model is generated by the initial neural network model after a training of a first number of iterations, the second segmentation model is generated by the initial neural network model after a training of a second number of iterations, and the first number is smaller than the second number;

determining a second portion of the plurality of branches of the target blood vessel from the image data based on one or more constraint conditions, wherein the second portion of the plurality of branches is one or more branch structures of at least one of the first portion of the branches; and determining the target blood vessel based on the first portion of the plurality of branches and the second portion of the plurality of branches, the target blood vessel including at least one of an arterial blood vessel or a venous blood vessel.

18. The method of claim 1, wherein the first segmentation model and the second segmentation model are acquired through a training process, the training process includes:

obtaining multiple pairs of samples, each pair in at least a portion of the multiple pairs of samples includes a sample image and a reference image corresponding to the sample image, and the reference image includes a marked target blood vessel; and training an initial neural network model through an iterative process;

the initial neural network model includes a first portion and a second portion, an output of the first portion is used as an input of the second portion, the first segmentation model is generated by the initial neural network model after a training of a first number of iterations, the second segmentation model is generated by the initial neural network model after a training of a second number of iterations, and the first number is smaller than the second number.

19. The method of claim 1, wherein the first portion of the plurality of branches of the target blood vessel includes a main branch of the target blood vessel, and the second portion of the branches includes branches of the main branch.

* * * * *